US008386587B2

United States Patent
Sagar et al.

(10) Patent No.: US 8,386,587 B2
(45) Date of Patent: *Feb. 26, 2013

(54) SERVER-ASSISTED AND PEER-TO-PEER SYNCHRONIZATION

(75) Inventors: Akash J. Sagar, Redmond, WA (US); George P. Moromisato, Seattle, WA (US); Richard Yiu-Sai Chung, Bothell, WA (US); Raymond E. Ozzie, Seattle, WA (US); Jack E. Ozzie, North Bend, WA (US); David Richard Reed, Seattle, WA (US); Michael Steven Vernal, Seattle, WA (US); Vladimir Dmitri Fedorov, Bellevue, WA (US); Muthukaruppan Annamalai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,321

(22) Filed: Apr. 26, 2012

(65) Prior Publication Data
US 2012/0210020 A1     Aug. 16, 2012

Related U.S. Application Data

(63) Continuation of application No. 11/766,985, filed on Jun. 22, 2007, now Pat. No. 8,239,479.

(51) Int. Cl.
G06F 15/16 (2006.01)
(52) U.S. Cl. .......................... 709/217; 707/710; 370/503
(58) Field of Classification Search .................. 709/217
See application file for complete search history.

(56) References Cited

U.S. PATENT DOCUMENTS

| | | | |
|---|---|---|---|
| 5,682,524 A | 10/1997 | Freund et al. | |
| 5,809,497 A | 9/1998 | Freund et al. | |
| 6,275,831 B1 | 8/2001 | Bodnar et al. | |
| 6,295,541 B1 | 9/2001 | Bodnar et al. | |
| 6,356,946 B1 | 3/2002 | Clegg et al. | |
| 6,505,205 B1 | 1/2003 | Kothuri et al. | |
| 7,003,531 B2 | 2/2006 | Holenstein et al. | |
| 7,007,041 B2 | 2/2006 | Multer et al. | |
| 7,200,620 B2 | 4/2007 | Gupta | |
| 7,207,008 B1 | 4/2007 | Koch et al | |
| 7,516,141 B2 | 4/2009 | Ruan et al. | |
| 7,734,690 B2 | 6/2010 | Moromisato | |
| 7,933,296 B2 * | 4/2011 | Augustine et al. | 370/503 |
| 2001/0044805 A1 | 11/2001 | Multer et al. | |
| 2003/0009602 A1 | 1/2003 | Jacobs et al. | |
| 2003/0069874 A1 | 4/2003 | Hertzog et al. | |
| 2003/0144892 A1 | 7/2003 | Cowan et al. | |
| 2003/0220966 A1 | 11/2003 | Hepper et al. | |
| 2004/0103167 A1 | 5/2004 | Grooters et al. | |
| 2004/0172423 A1 | 9/2004 | Kaasten et al. | |
| 2004/0172584 A1 | 9/2004 | Jones et al. | |
| 2004/0255115 A1 | 12/2004 | DeMello et al. | |
| 2005/0015413 A1 | 1/2005 | Teodosiu et al. | |

(Continued)

OTHER PUBLICATIONS

European Patent Application 08771572.8; Extended European Search Report dated Aug. 30, 2012.

(Continued)

*Primary Examiner* — Patrice Winder
*Assistant Examiner* — Tauqir Hussain

(57) ABSTRACT

Systems and methods for synchronizing data between endpoints using elements of centralized and decentralized synchronization systems and communication topologies are disclosed. Such systems and methods may in some cases synchronize some subset of data with a centralized endpoint while another subset of data is synchronized in a decentralized fashion directly with other endpoints. Such systems and methods may include a variety of cooperative functionality to assist in the synchronization of data between endpoints.

20 Claims, 10 Drawing Sheets

U.S. PATENT DOCUMENTS

| | | | |
|---|---|---|---|
| 2005/0060266 A1 | 3/2005 | DeMello et al. | |
| 2005/0198299 A1 | 9/2005 | Beck et al. | |
| 2005/0203851 A1 | 9/2005 | King et al. | |
| 2005/0203935 A1 | 9/2005 | McArdle | |
| 2005/0289133 A1 | 12/2005 | Arrouye et al. | |
| 2006/0106763 A1 | 5/2006 | Dirisala | |
| 2006/0190497 A1 | 8/2006 | Inturi et al. | |
| 2006/0218492 A1 | 9/2006 | Andrade | |
| 2006/0247961 A1 | 11/2006 | Klemow | |
| 2006/0248038 A1 | 11/2006 | Kaplan et al. | |
| 2006/0265262 A1 | 11/2006 | Kamdar et al. | |
| 2007/0094275 A1 | 4/2007 | Fanning et al. | |
| 2007/0185934 A1 | 8/2007 | Cannon et al. | |
| 2007/0282806 A1 | 12/2007 | Hoffman et al. | |
| 2008/0212616 A1* | 9/2008 | Augustine et al. | 370/503 |
| 2008/0219436 A1* | 9/2008 | Chen et al. | 380/30 |
| 2009/0216910 A1* | 8/2009 | Duchesneau | 709/250 |
| 2009/0234967 A1* | 9/2009 | Yu et al. | 709/232 |
| 2011/0047230 A1* | 2/2011 | McGee | 709/206 |

OTHER PUBLICATIONS

"BitTorrent"; Jun. 19, 2007; retrieved at https://en.wikipedia.org/w/index.php?title=BitTorrent&oldid=139216777; pp. 1-6.

"Synchronize data mirror with BitTorrent"; Jun. 1, 2006; retrieved at http://www.howforge.com/synchronize-data-mirror-with-bittorrent; p. 1.

RU Patent Application 2009147457; First Office Action dated Apr. 4, 2012.

Australian Patent Application 2008268539; Second Office Action dated May 11, 2012.

Russian Patent Application 2009147457; Second Office Action dated May 16, 2012.

Chinese Patent Application 200880021302.X; Second Office Action dated Jun. 5, 2012.

U.S. Appl. No. 11/766,985, Including O/As dated Oct. 1, 2009; May 26, 2010; Sep. 16, 2011; Feb. 8, 2012; and any future O/As.

U.S. Appl. No. 10/656,904, Including O/As dated Jan. 24, 2008; Oct. 17, 2008; Apr. 16, 2009; Jun. 18, 2009; and Nov. 9, 2009.

CN200880021302.X, Including O/As dated Aug. 18, 2011 and any future O/As.

AU2008268539, Including O/As dated Mar. 30, 2012 and any future O/As.

Reiss, S.; "Here Comes Trouble"; Wired Magazine; Feb. 2007; http://www.wired.com/wired/archive/15.02/trouble_pr.html; 4 pages.

International Search Report PCT/US2008/067636 mailed Jan. 8, 2009; 10 pages.

Australian Patent Application 2008268539; First Office Action dated Mar. 30, 2012.

CN Patent Application 200880021302.X; First Office Action dated Aug. 18, 2011.

* cited by examiner

SERVER-ASSISTED AND PEER-TO-PEER SYNCHRONIZATION

CROSS-REFERENCE TO RELATED APPLICATION

The present application is a continuation of, and claims priority to, U.S. patent application Ser. No. 11/766,985 filed Jun. 22, 2007, now U.S. Pat. No. 8,239,479, which is incorporated herein by reference in its entirety.

BACKGROUND

Data may be synchronized between different endpoints, such between different computing devices, in a wide variety of ways and using a wide array of connection topologies. For example, some systems or techniques may rely on endpoints to synchronize with a single (or multiple) centralized endpoints, such as computing servers. In other systems or techniques, endpoints might communicate directly with each other in a variety of ways, including in one or more decentralized or peer-to-peer topologies.

Different arrangements of endpoints and different communications topologies may each have their own advantages and disadvantages. As just one example, a system in which endpoints synchronize data directly with each other, perhaps without the use of a centralized or "server" endpoint, may have a variety of advantages. For example, in such a system endpoints might be able to communicate and synchronize data with other endpoints that are physically or logically "close" without being required to first (or perhaps to ever) synchronize data with a central server that might be located farther away than the synchronizing endpoints. As another example, if endpoints can communicate with a variety of other endpoints, a single point of failure—as might exist if a centralized server endpoint is required—may be eliminated. As another example, in some implementations at least a peer-to-peer synchronization system may be easier to set up or configure, if, for example, such set up doesn't require configuring one or more servers that have particular requirements such as always needing to be available to service requests from other endpoints or being able to scale to provide additional capacity.

However, decentralized systems may also have disadvantages, including at least some disadvantages that may in some cases be corrected or provided for in a topology that uses one or more centralized endpoints. For example, peer-to-peer endpoints may not always be available or able to synchronize data (in contrast to at least some "server" endpoints, which might be configured to be "always available"), and the lack of an available endpoint may mean sometimes that data may not be synchronized until or unless a particular endpoint is available. Another potential disadvantage may relate to determining how to efficiently synchronize data, particularly large amounts of data, between a set of endpoints connected in, perhaps, an arbitrary topology. In at least some cases, determining which endpoints should synchronize with which other endpoints, what data should be synchronized, and so on, is not a trivial problem, and solutions may be computationally intensive to find, may be sub-optimal (which may lead in turn to problems such as transferring more data than is necessary), and so on. Another potential disadvantage of decentralized systems is that information about the system of endpoints—such as characteristics of the endpoints, a holistic view of the data communicated by particular or all endpoints, and so on—may be more difficult to gather when no one endpoint, or a subset of endpoints, necessarily synchronizes or has access to all or at least a significant amount of the synchronized data. Yet another potential disadvantage may be related to applying security policies or other security-related functionality without necessarily being able to fully trust any particular peer machine; at least some of such security issues may in some implementations be ameliorated with the existence of one or more centralized and perhaps trusted endpoints.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward synchronizing data between endpoints using elements of centralized and decentralized synchronization systems and communications topologies. In at least some implementations, some subset of synchronized data may be communicated to a centralized endpoint, while another subset of the synchronized data may be communicated in a decentralized or peer-to-peer fashion directly with other endpoints. In addition, in some implementations, a variety of cooperative and potentially beneficial functionality may be implemented on particular endpoints—including on centralized endpoints—to assist in the synchronization of data between endpoints.

DETAILED DESCRIPTION

Described herein are various techniques and technologies directed toward synchronizing data between endpoints using elements of centralized and decentralized synchronization systems and communications topologies. More particularly, in at least some implementations, some subset of synchronized data may be communicated to a centralized endpoint, while another subset of the synchronized data may be communicated in a decentralized or peer-to-peer fashion directly with other endpoints. In addition, in some implementations, a variety of cooperative and potentially beneficial functionality may be implemented on particular endpoints—including on centralized endpoints—to assist in the synchronization of data between endpoints.

Figure 1:
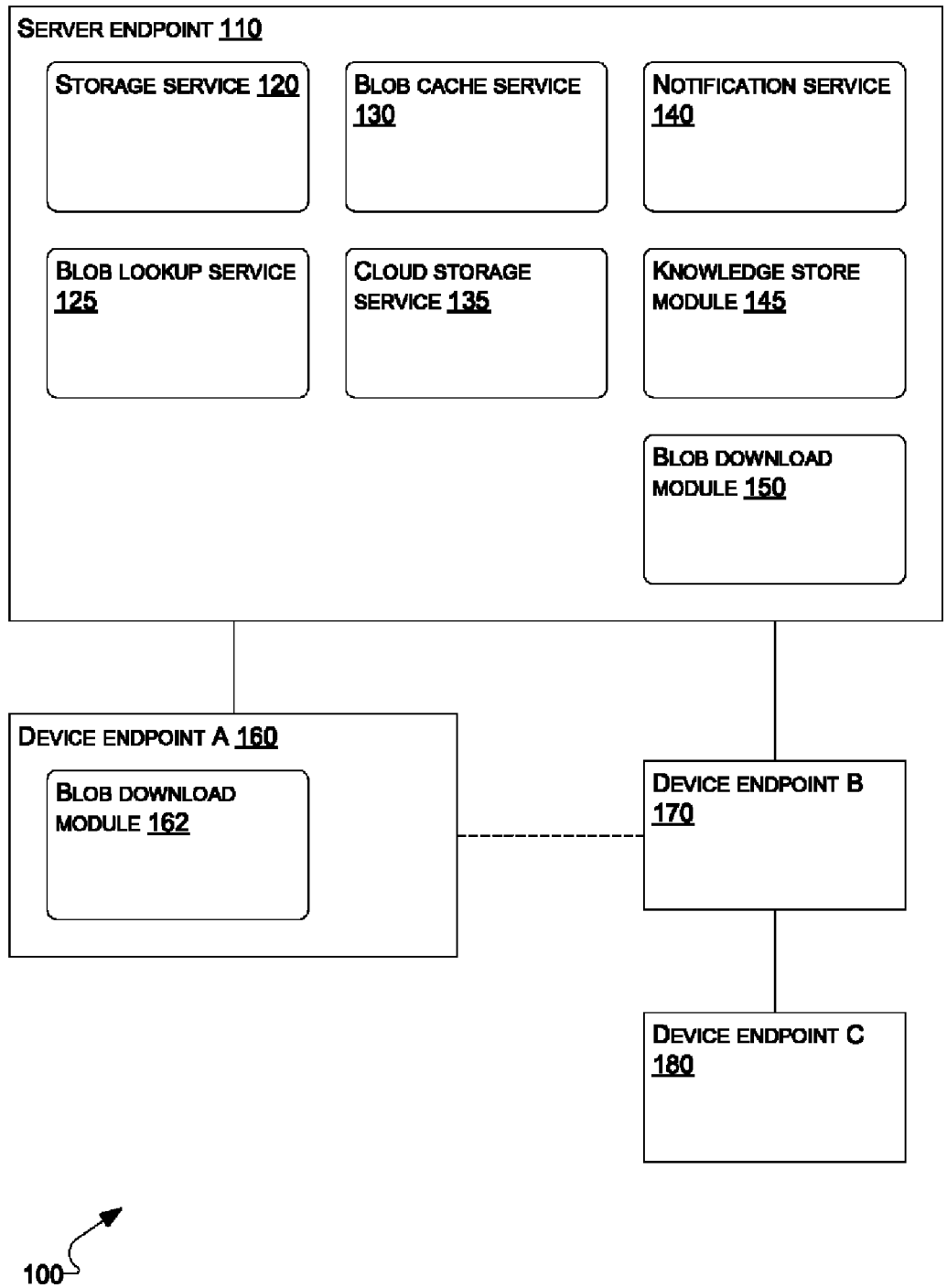
FIG. 1 illustrates an exemplary system in which data may be synchronized and shared in both centralized and peer-to-peer topologies.

Turning now to FIG. 1, shown therein is an exemplary system 100 in which data may be synchronized and shared in both centralized and peer-to-peer topologies. The exemplary system 100 contains server endpoint 110, device endpoint A 160, device endpoint B 170, and device endpoint C 180. The exemplary server endpoint 110 is shown as containing storage service 120, blob lookup service 125, blob cache service 130, cloud storage service 135, notification service 140, knowledge store module 145, and blob download module 150. The exemplary device endpoint A 160 is shown as containing blob download module 162. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally and in at least some implementations, data may be synchronized between any two, or more, endpoints. For example and without limitation, as illustrated in FIG. 1, data might be synchronized between the device endpoint A 160 and the server endpoint 110. The same or other data might then be synchronized between the server endpoint and the device endpoint B 170. The device endpoint B might then in turn in some cases synchronize data with device endpoint C 180. In some implementations, particular endpoints may only synchronize with particular other endpoints, while in other implementations endpoints may synchronize with a wide variety of endpoints, including in some implementations with all other endpoints.

While a wide variety of synchronization techniques exist and may be used, in at least some implementations at least some data may be synchronized between endpoints using a technique such as Simple Sharing Extensions (SSE). SSE may be generally described as encompassing data formats and processes for sharing and synchronizing data between endpoints using the addition of (relatively) simple data to a feed document, such as an RSS ("Really Simple Syndication" or "Rich Site Summary") or Atom document. In some cases, a feed that includes SSE information may be referred to as an "SSE feed."

With such implementations, or with at least some other implementations, endpoints may make data available to other endpoints for synchronization by providing a feed document that includes both SSE information and at least a portion of the synchronized data. The endpoint to which the information is being synchronized might obtain the feed document and interpret its contents using, among other techniques, SSE processes for merging information from feeds with information in one or more data stores. As part of this process, the endpoint to which the information is synchronized may generally update its own copy or version of the synchronized data, and thereby complete the synchronization of data from the first endpoint to the second endpoint. As just one specific example, the device endpoint A 160 might make an RSS feed that includes SSE information available to the server endpoint 110 so that information maintained or accessed by the device endpoint A can be synchronized to the server endpoint. The server endpoint might obtain the feed and merge the contents of the feed—possibly using an "SSE merge"—with data maintained by the server endpoint. After such a merge, at least some of the data provided by the device endpoint A may have been incorporated into data maintained by the server endpoint. Furthermore, additional changes to data made on the device endpoint A may also be synchronized to the server endpoint in a similar fashion: the additional change may be made on the device endpoint A, the device endpoint A may update its provided feed to include the additional change, and then the server endpoint may process the updated feed and incorporate the additional change.

The previous explanation describes how data and changes may be synchronized in one direction: from a first endpoint to a second endpoint. A variety of synchronization techniques, including SSE, also make it possible for changes to be synchronized in the "other direction"—that is, from the second endpoint in this example to the first endpoint. For example, when SSE is used as in the previous example with the device endpoint A 160 and the server endpoint 110, the server endpoint might also make available its own SSE feed that (initially at least) includes the same information provided by the device endpoint A. Then, when some of the information encompassed by the feed is updated on the server endpoint, the server endpoint may in turn update its own feed to include both the change or updated data and corresponding updates to the SSE information in the feed. Another endpoint that synchronizes this information from the server endpoint, including the device endpoint A, may then obtain the feed and merge the changes (perhaps performing the same or similar merge processing as is executed by the server endpoint to incorporate changes from the device endpoint A). In summary, with some synchronization techniques two endpoints may synchronize the same data with each other—so that either endpoint may make changes to the data, for example—by each making the data available and by each updating their own local data when the data provided by the other endpoint changes.

Furthermore, multiple endpoints may be able to synchronize with a single (or multiple) endpoints using techniques such as those described by at least some synchronization techniques, including SSE. For example, the device endpoint B 170 might synchronize the same (or some other) data that is synchronized between the device endpoint A 160 and the server endpoint 110. When SSE feeds are used, the device endpoint might synchronize the same data by retrieving a feed provided by the server endpoint—including in some cases the same feed that is retrieved by the device endpoint A—and incorporating the data or changes represented by the feed. The device endpoint B might also make a feed available to the server endpoint so that the server endpoint can include changes made to the data by the device endpoint B.

While in some cases data may be synchronized between devices through another endpoint—as in, for example, the previous exemplary description where changes made by the device endpoint A 160 might have been synchronized to the device endpoint B 170 through the server endpoint 110—other synchronization topologies may also be available in at least some cases, and when using at least particular synchronization techniques. For example, in some cases, a synchronization technique or protocol, including SSE, may provide the ability to synchronize through both a centralized server—like perhaps the server endpoint 110—and directly with other endpoints. For example, the device endpoint A might in some implementations be able to synchronize data to the device endpoint B either by synchronizing through the server endpoint 110 or by synchronizing directly with the device endpoint B (as shown by the dashed line in FIG. 1 between the device endpoint A and the device endpoint B). In the same or other implementations, the device endpoint B might synchronize data directly with the device endpoint C 180. For example, such direct synchronizations might be implemented between the device endpoint A and the device endpoint B, or between the device endpoint B and the device endpoint C, by the exchange of SSE feed documents and the merging of the data comprised in the exchanged feeds. Furthermore, in some implementations the existence of a server endpoint may not even be required. For example, in some implementations metadata and blob data may in some cases be communicated directly between device endpoints that know of the location of other device endpoints without the intervention of or assistance provided by one or more server endpoints.

In at least some implementations, a wide variety of types of data may be synchronized between endpoints. For example, two endpoints might synchronize text information comprising a wide variety of information; might synchronize "binary" information such as audio or video files, or compiled executable code; or might synchronize any other type or format of data.

Data that is synchronized may be represented in a wide variety of ways. In some implementations, such data may be included in the information that is synchronized between endpoints, including information synchronized through the use of steps as described previously. For example, in implementations that use SSE, such data may be included in SSE feeds that are exchanged between endpoints. However, in the same or other implementations, the information communicated between endpoints may not include all of the data that may be ultimately synchronized or communicated between endpoints. In some of such cases, the information communicated between endpoints may instead or also include references to other data to be synchronized. Such references may be provided in a variety of ways, such as perhaps through the use of "enclosure" elements in RSS or Atom feeds that include URLs that reference resources. The data identified by the references may then be accessed or stored using a variety of means.

As used herein, the term "metadata" may be interpreted to refer to information communicated between endpoints that identifies (and may, in some implementations, include) the data that is synchronized or communicated. For example, in some implementations metadata may be embodied by a document or feed that includes an "item" for each piece of synchronized data. Each item, in turn and in some exemplary implementations, might include a "sync data" portion and an "item data" portion. In such cases, the sync data may be associated with information about the synchronization of the particular item while the item data may be associated with the information to be synchronized. For example, the sync data might include information such a version number associated with the item and a history of how or when the item was updated, while the item data might include the item itself, or at least information associated with the item.

In some cases all of the item data may be included in the metadata, while in other cases the metadata may not include all of the item data and may instead include one or more references to item data. Using references may enable the metadata to remain (relatively) small, especially in cases where there are large amounts of item data. For example, rather than including all of a large audio or video file in the item data portion of the metadata itself, an item data element might instead include some type of reference or identifier that refers to, identifies, or otherwise assists in the retrieval of the large audio or video file. Such information or data, such as might be referenced by the metadata, may be stored or accessed separately from the metadata and may in some cases be referred to as a "blob" of data or simply as a "blob" or "enclosure." (In some cases it may also be possible for at least portions of the sync data to not be included in the metadata and to instead be referenced from the metadata.)

In implementations that use SSE, metadata may in some cases be embodied by an SSE feed. For example, an RSS feed that includes SSE information might be embodied as an XML document that includes common RSS XML elements, such as "item" elements for each piece of data. Each "item" element might in turn include sync data—which might be embodied by an XML element named "sync", in at least some implementations—and item data—which might be embodied by an XML element named "item", in at least some implementations, and might include information about the item, or the item itself.

Generally, the item data or item data element may include any type of data. In a simple case with an RSS document, item data might include standard RSS elements like "title" and "description". In the same or other cases item data might include, for example, contact information perhaps encoded using a format like hCard, or other data. In yet other, or the same, implementations, item data might include one or more references to information located elsewhere, including information that is not included in the metadata or RSS feed. When the metadata uses RSS, such references might be embodied using an element like the RSS "enclosure" element.

It should be noted that in at least some cases the metadata may include all of the information that is synchronized. That is, metadata synchronized between endpoints may not always reference or identify other information. If, for example, the metadata includes, say, all of the information associated with a contact, the synchronized data—including a feed or document—that includes the contact information may still generally be referred to as metadata.

While many synchronization techniques transfer both information about the data to be transferred (that is, metadata) and the information itself—including blobs of data referenced by the metadata—together at the same time, or using the same endpoints, there may be some benefits in treating metadata and blobs separately, as is done by least some of the techniques described herein. In at least some implementations, for example, the amount of metadata may not be as large as the amount of referenced or blob data, and so it may be advantageous to communicate the metadata in one way and between particular endpoints, while communicating blob data in another way and perhaps between a different set of endpoints. In one such arrangement, metadata might be communicated to and through the use of the server endpoint 110, while blob data may be communicated in at least some cases directly between device endpoints. Furthermore, while some or all of the metadata may be transferred between all endpoints that synchronize data, blob data may not necessarily be communicated between every endpoint. For example, a blob might only be communicated between endpoints when, for example, that blob is specifically requested or required.

Furthermore, in some implementations one or more alternate representations of blob data may be generated and communicated between endpoints depending on a variety of characteristics. For example, an endpoint that is only connected to one or more other endpoints using a communication mechanism that communicates information relatively slowly might desire or retrieve blobs that are in some cases smaller than the blobs that might be retrieved by at least some other endpoints. In one specific example, a mobile phone connected using a relatively low-bandwidth data network might obtain an image or video file that has been transcoded or converted so that the image or video is represented in a smaller amount of space (perhaps by reducing the size of the image, by using more aggressive compression settings, and the like). Other kinds of alternate representations may also be possible or supported by at least some implementations. For example, some endpoints might retrieve, say, a clip of an audio or video file rather than the entire audio or video file, and so on.

In at least some of such implementations, one or more particular endpoints may have the capability of generating or providing particular alternate representations. For example, in some implementations an "alternate representation service" or "transcoding service" might exist on a server endpoint 110 (not shown in FIG. 1) and might participate in the generation of at least some alternate representations of blobs stored on the server endpoint or on other endpoints. In the same or other implementations at least some particular other endpoints, such as one or more device endpoints, might also or instead have the capability of providing alternate representations of blobs. Additional modules, services, and processes related to the generation and providing of alternate representations are also as described further elsewhere herein.

An exemplary implementation of a server endpoint might include a variety of functionality, including one or more of the services and modules illustrated in FIG. 1 as being a part of the exemplary server endpoint 110. As has been previously stated, not all server endpoints may include all of the illustrated modules and services, while other server endpoints may include additional modules and services. Furthermore, while some of the modules and services may be described as communicating with each other in specific ways, in general many modules and services may communicate with other modules or services, including with modules and services located on the server endpoint as well as on other endpoints and including with modules and services where such communication is not specifically described. For example, the knowledge store module 145 may be described as being used with, say, the blob cache service 130 in one or more specific ways, but such description does not limit the knowledge store module to only communicating with the blob cache service or with other modules or services where the communication is specifically described; the knowledge store module may in at least some implementations also communicate with a variety of other modules or services. Furthermore, although not shown in FIG. 1, in some implementations more than a single server endpoint may exist. In at least some of such implementations, at least some server endpoints may communicate with other server endpoints and participate in the synchronization of data between different endpoints. Each of such multiple server endpoints may include only some or perhaps all of the exemplary services and modules illustrated in FIG. 1 as being part of the exemplary server endpoint 110.

An exemplary storage service 120 may generally store metadata and provide the ability for other endpoints to synchronize metadata with the server endpoint 110. An exemplary device endpoint A 160 might, for example, make a local change and update metadata it maintains so that the metadata includes the change, and then communicate the updated metadata to the storage service. The storage service might then merge the changes in the metadata communicated from the device endpoint A with some representation of the same metadata that is managed by the storage service. The storage service might then make its own merged or updated metadata available to other endpoints (which might in turn enable other endpoints to retrieve the metadata provided by the storage service and then incorporate the change made originally by the device endpoint A). A storage service may store and provide multiple separate pieces of metadata, such as multiple SSE feeds in at least some implementations, and each piece of metadata may identify different (or the same) sets of data. At least some of the operations that might be performed by an exemplary storage service 120 may be described in more detail below, with reference especially to FIG. 5.

In some implementations, including those that use SSE, a storage service may accept (or retrieve, or obtain in some fashion) SSE feeds made available by other endpoints. The storage service may then merge the changes in the obtained feeds with a local representation of the feed that the storage service may store or access in a variety of ways, including as a file itself, as records in a database, and so on. The storage service may then make an updated feed that is the result of the merge operation available to at least some endpoints, also in a variety of ways including as a file accessible by other endpoints—perhaps using a web or file server, by proactively communicating the updated feed to other endpoints, and so on.

In some implementations, an exemplary blob lookup service 125 may accept some data that identifies a blob, such as a blob identifier, and provide one or more "locators" that an endpoint might then use to obtain or retrieve the blob. For example, in implementations including those where metadata and blobs may be communicated or synchronized differently or separately, one or more endpoints may provide, to a blob lookup service, information including the location or locations where a particular blob may be retrieved. In some implementations, such locations might include device endpoints, a blob cache service 130, or a cloud storage service 135. The blob lookup service might then at some later time provide another endpoint that wants to obtain the blob with one or more of these locations. At least some operations that might be performed by an exemplary blob lookup service may be described in more detail below, with reference especially to FIG. 4 and FIG. 6.

A blob identifier may generally be some piece of data that identifies a blob. In some implementations, a blob identifier might be used by a variety of device and server functionality to particularly identify a blob without requiring that the blob itself be communicated. So, for example, a storage service and other endpoints might use a blob identifier in metadata, a blob lookup service might store and provide locations using a blob identifier, a blob cache service or cloud storage service might store blobs that are indexed or may be retrieved using an associated blob identifier, and so on. In some implementations, a single blob identifier may be used by a variety of modules or functionality to identify a blob, while in the same or other implementations multiple and perhaps different blob identifiers may be used—perhaps by different modules or functionality—to identify a particular single blob.

A blob identifier might be implemented in a variety of ways and take a variety of forms. In at least one implementation, a blob identifier might just be a string or set of alphanumeric or other characters, such as something like "ABC123", "ABCDEFGH", "123456", and so on. In another implementation, a blob identifier might take the form of, for example, a uniform resource locator (URL) or uniform resource identifier (URI), such as perhaps "http://www.els.live.com/ABC123", "http://www.els.live.com/ABCDEFGH", "http://www.els.live.com/123456", and so on. In such an example, the string following the "http://www.els.live.com/" portion of the identifier may actually identify the blob. In some cases, the "http://www.els.live.com/" portion of the identifier may be used for a variety of other purposes, including, perhaps, to make the blob identifier appear more like an identifier with which a user might be familiar, or even to actually locate the blob in at least some particular cases, including in an exemplary implementation described below with reference especially to FIG. 9.

An exemplary blob cache service 130 may provide a storage location for transient blobs or files. Such a location may in some cases aid in the transfer of blobs between endpoints. For example, suppose the device endpoint A 160 synchronizes metadata with the server endpoint 110, and such metadata identifies a blob that is available from the device endpoint A. Also suppose that the blob is not communicated to the server endpoint—instead, it remains, available for retrieval, on the device endpoint A. Suppose then that the device endpoint A goes offline or becomes unavailable to one or both of the server endpoint and the device endpoint B 170. Now, if the device endpoint B synchronizes the metadata from the server endpoint and determines that it wants to retrieve the blob from the device endpoint A, it may not be able to do so, because the device endpoint A—which may have the only copy of the blob—is not online or available. Such a problem may be resolved through a variety of means, including through the use of a blob cache service. In one such implementation, the blob associated with the metadata provided by the device endpoint A may be stored in the blob cache service before the device endpoint A becomes unavailable, and then the device endpoint B may retrieve the blob from the blob cache service instead of from the device endpoint A.

As a cache, an exemplary blob cache service may store blobs as transient data. That is, in contrast perhaps to the cloud storage service 135 described below, blobs stored by the blob cache service may only be stored for a limited period of time and might be removed at a variety of times controlled in some cases by the blob cache service itself, or by some other module or service. For example, in some implementations, a blob cache service might use one or more caching algorithms to determine when to delete blobs or replace currently stored blobs with new blobs. For example, in at least one implementation, a blob cache service might first fill up or occupy its available storage space and then, when a new blob is to be stored, might use an algorithm such as a "least recently used" (or LRU) algorithm to find and delete one or more blobs that have not been used recently and so make space available for new blob data. In some cases at least, implementing functionality associated with a blob cache service may require fewer monetary, operational, or other resources than implementing functionality associated with a persistent store, including perhaps the cloud storage service 135 described below. For example, because information associated with a blob cache service may not be guaranteed to be stored reliably or indefinitely, a blob cache service may not require the same level or types of redundant data storage functionality that might be required by a store designed to hold at least some other non-transient data.

At least some operations that might be performed by an exemplary blob cache service 130 may be described in more detail below, with reference especially to FIG. 7.

An exemplary cloud storage service 135 may provide storage "in the cloud" for generally non-transient data. That is, while it may operate in some ways like a blob cache service—in that it may store blobs, for example—a cloud storage service may be viewed by users and endpoints as, for example, "always on" or "always accessible" and as providing "reliable" storage. Endpoints may store blob data using a cloud storage service in a variety of cases, including in some cases in lieu of storing blob data on, say, a device endpoint. At least some operations that might be performed by an exemplary cloud storage service may be described in more detail below, with reference especially to FIG. 8.

In some implementations, one or more additional services or modules that provide storage for blob data and operate differently than a blob cache service 130 or a cloud storage service 135 may be a part of an exemplary server endpoint 110. For example, in one implementation such a different blob data storage service might provide storage that is relatively more persistent than that provided by a blob cache service but relatively less persistent than that provided by a cloud storage service (at least as these exemplary services have been introduced above). Such a service might do so by determining when to store a blob using, for example, knowledge of the other endpoints on which the blob might be stored or from which the blob might be available. For example, such a blob data storage service might not store a blob if some knowledge indicates that the blob is already stored on some number of other endpoints that are known to be relatively highly available. In one specific example, then, if knowledge that is accessible to the blob data storage service indicates that a particular blob is stored on, say, four other endpoints that are typically on and connected to the network most or all of the time, then an exemplary blob data storage service might be able to not store the blob because a requesting endpoint would likely be able to retrieve the blob from at least one of the four other endpoints. It should also be noted that in at least some implementations, such different mechanisms do not necessarily need to be implemented in some new type of blob data storage service—instead, such mechanisms might be a part of or included in a blob cache service or cloud storage service.

An endpoint that synchronizes particular metadata generally may want to know when such metadata has been updated on one or more other endpoints, so that, for example, the endpoint can update its own copy of the metadata, as well as possibly retrieve any desired blob data. In one, sometimes inefficient, implementation, an endpoint might "poll" or periodically check one or more other available pieces of metadata—perhaps including those provided by a server endpoint 110—and determine that there are changes to synchronize when the other metadata has changed. Alternatively, an endpoint might make use of the functionality provided by an exemplary notification service 140. A notification service might provide the ability for endpoints to register or indicate an interest in particular metadata, and then might provide notifications to interested or registered endpoints when particular metadata changes. As a result, an endpoint may be able to avoid polling for changes, or at least may poll less often, and still be able to take some action when metadata changes. Notifications may be implemented in a variety of ways, including through the use of point-to-point or broadcast functionality provided by a variety of networking or other communication mechanisms. In the same or other implementations, an exemplary notification module might also provide notifications about other events besides changes to metadata. For example, in some implementations a notification module might periodically provide endpoints notifications that include information about updated or changed locators (such locators might be managed by an exemplary blob lookup service). Using updated locators when retrieving blobs may enable an endpoint to change how it retrieves blobs and so perhaps retrieve blobs more efficiently, adapt to changing network or other conditions, and so on.

An exemplary knowledge store module 145 may provide a store for and access to "knowledge" that may be gained through the interactions or functionality provided by the server endpoint 110. Such knowledge may then be used in some cases for a variety of purposes, including to control or optimize the synchronization of data. While more examples of how knowledge may be gathered and used may be described elsewhere herein, in some cases knowledge may generally relate to data such as characteristics associated with endpoints that communicate with the server endpoint or that communicate with other endpoints. Characteristics stored or used by the knowledge store module may generally be referred to as "knowledge characteristics." For example, some exemplary knowledge characteristics may include information about the manner in which a device endpoint commonly connects to the server endpoint, like the speed of the connection, the available bandwidth of the connection, any costs associated with the connection, and so on. For example, a connection might be over a high-speed data network or over a relatively slow mobile phone network, a connection might have free bandwidth at particular times of the day but be in use at other times of the day, and so on. Knowledge characteristics might also include other information about endpoints, including information about when the endpoint is commonly online or available—the device might be a laptop or a mobile phone and might be intermittently connected, might be an "always-on" desktop computer that is "always" connected, or so on. As another example, a knowledge module might store information arising from the interaction of endpoints with the server endpoint, such as how often particular blobs are requested, from which endpoints blobs are requested, and so on. Regardless of how or where the knowledge is obtained, it may then be provided and used by the server endpoint, or possibly by other endpoints, in a variety of ways, including as part of controlling or optimizing how data is synchronized.

In yet another example, knowledge—such as the connection characteristics or other characteristics of a device, or other knowledge—may be used to determine whether to identify or provide one or more alternate representations of a requested blob. For example and as introduced previously, an alternate representation might comprise, say, a smaller transcoded version of an otherwise large image when the image is requested by an endpoint connected using a slow connection mechanism or when the blob will be stored on an endpoint that has relatively more limited storage space. In the same or another example, the knowledge may include whether particular endpoints have particular alternate representations of a particular blob, and/or whether particular endpoints have the capability of generating or providing a blob represented using a particular alternate representation (perhaps by generating the alternate representation on the particular endpoint, by retrieving an alternate version from some other endpoint, and so on).

Finally, an exemplary blob download module, such as the blob download module 150 that is a part of the server endpoint 110 or the blob download module 162 that is a part of the device endpoint A 160, may in some cases download or retrieve blobs from a variety of other locations, including other endpoints. Generally, a blob download module may use one or more blob retrieval mechanisms to retrieve some portion of a blob, or an entire blob, where a "blob retrieval mechanism" may specify, for example, one or more ways in which a blob may be located and/or one or more ways in which a blob may be retrieved. One, perhaps relatively simple, blob download module may only be able to retrieve blobs using, for example, a single blob retrieval mechanism that uses a protocol such as HTTP, FTP, or a one of a variety of other file sharing protocols. Another blob download module might be able to retrieve a file using any of such blob retrieval mechanisms, as well as other blob retrieval mechanisms. For example, some blob download modules might be able to use mechanisms that may retrieve pieces of the same blob from a variety of endpoints, "at the same time," such as mechanisms described by a protocol like the BitTorrent protocol. The same or other blob download modules may also use other functionality to more efficiently retrieve blobs, such as, for example, "differential compression," where only the parts of a blob that have changed are communicated so that the entire blob does not need to be communicated every time even a small part of the blob changes. Some blob download modules may in some cases locate a blob using a blob lookup service that may in some implementations be the same as or similar to the exemplary blob lookup service 125 introduced previously, while in the same or other implementations blob download modules may locate or retrieve a blob without the use of blob lookup functionality or the use of a blob lookup service.

Furthermore, in some cases a blob download module may use a "pluggable" architecture to organize the blob retrieval mechanisms (or "drivers" in this context) used by the blob download module. For example, one blob retrieval mechanism or driver may enable the retrieval of blobs from an exemplary blob cache service, another driver may use a blob lookup service to retrieve a set of endpoints that may be able to provide the blob and then retrieve the blob from one or more of such endpoints (including through the use of BitTorrent-like mechanisms in some cases with more than one endpoint), yet another driver might not use a blob lookup service and might identify one or more endpoints from which to retrieve the blob using one or more of a variety of other mechanisms, and so on. A pluggable architecture may also enable additional blob retrieval mechanisms to be added at a variety of times, including after a blob download module has been deployed or already used, without necessarily changing the overall organization or implementation of the blob download module or the endpoint that includes the blob download module. Such functionality may enable the later addition of new blob retrieval mechanisms without changing the core blob download module or the endpoint itself.

It should be noted that each endpoint in this example might represent any number of general-purpose or dedicated computers, including desktop computers, server computers, laptop computers, workstation computers, mobile or cellular telephones, personal digital assistants (PDAs), and the like. Furthermore, while particular exemplary endpoints may be described as being "device" or "server" endpoints, such designations do not necessarily limit the nature of the computing hardware or type of endpoint. A server endpoint or device endpoint may in at least some implementations be implemented on any type of computing hardware, including desktop computers, server computers, laptop computers, workstation computers, mobile or cellular telephones, PDAs, and so on. Generally, whether an endpoint is considered a device endpoint or a server endpoint may be determined, among other characteristics, by the functionality provided by the endpoint rather than by, for example, the nature of the computing hardware on which the endpoint is implemented. For example, an endpoint that provides server functionality using one, or more, of the services and modules described previously as being associated with an exemplary server endpoint 110 might be considered to be a server endpoint, even if the endpoint is implemented on, say, a laptop computer. It should also be noted that an endpoint may provide server functionality at particular times—and so might be considered a server endpoint—while operating as a device endpoint or other type of endpoint at the same or other times. Also, in some implementations, a particular or single computing device may host or include multiple endpoints. In these or other implementations, the communication of information between endpoints may in at least come cases comprise only communication between executable code that runs on the particular single computing device.

Endpoints and even modules and services within an endpoint may be connected using a variety of networking or other connection means. Such communications means may include any means by which data may be transmitted, including any type of network—such as an Ethernet, Wi-Fi, or mobile telephone or data network—and in at least some cases any other kind of transfer, including the transfer of physical media, like a compact disc (CD) or flash memory drive.

Figure 2:
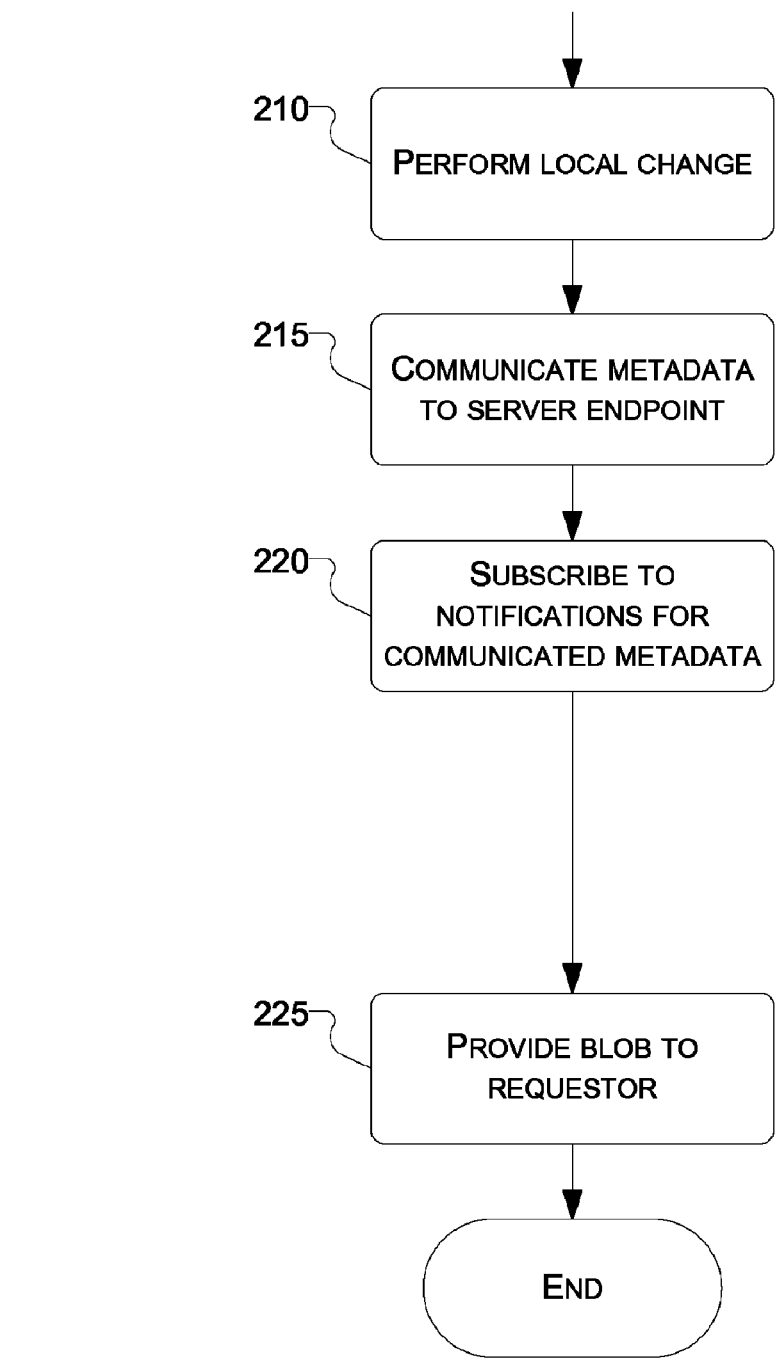
FIG. 2 illustrates an exemplary generalized operational flow including various operations that may be performed by an endpoint, including a device endpoint, when changing data that is synchronized and making such a change available to other endpoints.

Turning now to FIG. 2, shown therein is an exemplary generalized operational flow 200 including various operations that may be performed by an endpoint, including a device endpoint, when changing data that is synchronized and making such a change available to other endpoints. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 210, a change is made to local data on an endpoint, such as perhaps the device endpoint A 160 that was previously introduced with reference to FIG. 1. For example, a user might use an application to create new data or to modify or delete existing data. The modified data might include one or more of a wide variety of types of data, such as, for example, and without limitation, contacts, calendar items, audio clips, video clips, word processing or spreadsheet files, other files, and so on.

Such a change might then result in one or more changes to metadata or blob data that is synchronized between endpoints. For example, suppose a user creates a new video file using, say, a video editing application, and that the new file is part of data that is synchronized with at least one other endpoint. As part of operation 210, or as part of another operation, metadata maintained by the endpoint on which the change was made might be updated so that the metadata includes an item associated with the new video file. Such a new item might include, in at least some implementations, data relevant to the synchronization of the item (such as perhaps version information or data about when the item was created or, later, updated) as well as information about the item itself, such as, perhaps, a name for the video, a text description of the video, and a reference that identifies the actual video data or content (if the video data or content is not included in the metadata feed itself). When an existing item is modified, the metadata and possibly blob data may be similarly updated. If an existing item is deleted, the metadata may be modified so that, for example, the item is marked as being deleted, and any associated blob data may be deleted (or may be kept available, in at least some implementations).

In an exemplary implementation of operation 215, the metadata that was updated as part of operation 210 may be communicated to a server endpoint, such as, perhaps, a server endpoint that is in at least some way like the exemplary server endpoint 110 described previously with reference to FIG. 1. Such communication may be implemented in a wide variety of ways depending on, for example, how the metadata is represented and the networking or other communication functionality available to the endpoint that has made the change or that is available to the receiving endpoint. For example, in an implementation where the metadata is embodied in an XML document, the metadata may be communicated to the server endpoint using, perhaps, an HTTP POST request that contains the XML document and that is submitted to an HTTP server running on or associated with the server endpoint. In another implementation, the endpoint that has made the change might make the updated metadata available at a particular location, say, on a network share or through an HTTP server associated with the endpoint itself, and the server endpoint may retrieve the metadata from that location.

In at least some implementations, blob data associated with the metadata change may not be communicated to the server endpoint. Instead, the blob data may be, for example and without limitation, retained (at least for some period of time) on the endpoint where the change was made. For example, when the blob data comprises video data that was created on the endpoint, the video data may reside only on the endpoint after an implementation of operation 215 has completed. In some cases, such blob data may be retrieved or obtained by another endpoint at some later point in time.

In some implementations, a blob lookup service may be updated as part of an implementation of operation 215 so that the blob lookup service includes location information for the blob data associated with the metadata change. Another endpoint might then use the blob lookup service as part of retrieving the blob data from the endpoint. In the same or other implementations a blob lookup service may be updated when another endpoint merges or processes the metadata communicated to another endpoint. Such an operation might be implemented, in some examples at least, by an operation like the operation 525 described below with reference to FIG. 5.

Finally, while in some implementations of operation 215 the updated metadata may be communicated to a server endpoint, in the same or other implementations, the updated metadata may instead, or also, be communicated to one or more other endpoints, including other server endpoints or other device endpoints, such as the device endpoint B 170 and/or the device endpoint C 180, both described previously with reference to FIG. 1. For example, in an implementation where the metadata includes or uses SSE information, and so metadata may be communicated and synchronized between arbitrary (and sometimes non-server) endpoints, at least some implementations of operation 215 may communicate the updated metadata to a variety of other endpoints.

In an exemplary implementation of operation 220, the endpoint on which the change was made may subscribe or register to be notified of future updates to the metadata that was previously communicated to the server (or other) endpoint. After such a subscription or registration, the endpoint may then in at least some cases receive notifications (embodied or implemented in a variety of ways) when the metadata changes on some other endpoint, such as on the server endpoint to which the updated metadata was previously communicated. As described previously, this may enable the endpoint to be aware of other changes to data with which it is concerned without requiring that the endpoint actively poll or check for changes to the data.

While a subscription or registration may be made in some cases as part of executing operation 220, the same (or a different) subscription or registration may be made at another time, or may not be made at all.

In an exemplary implementation of operation 225, the endpoint may respond to a request for the blob associated with the metadata change by, for example, providing the blob to the requestor. That is, for example, at some point in time after the metadata change that refers to or is associated with the blob is received or processed by one or more other endpoints, one or more of those other endpoints (or another endpoint) may determine that they need or desire the data comprised by the blob. In some implementations, including those where the blob data is not communicated as part of the metadata, such other endpoints may then retrieve the blob by requesting it from another endpoint on which the blob exists. The way in which the blob is requested, as well as the manner in which the blob is provided to the requestor, may be implemented in a wide variety of manners including some of those previously introduced with reference to, for example, a blob lookup service and a blob download module, as well as those described in more detail below.

Figure 3:
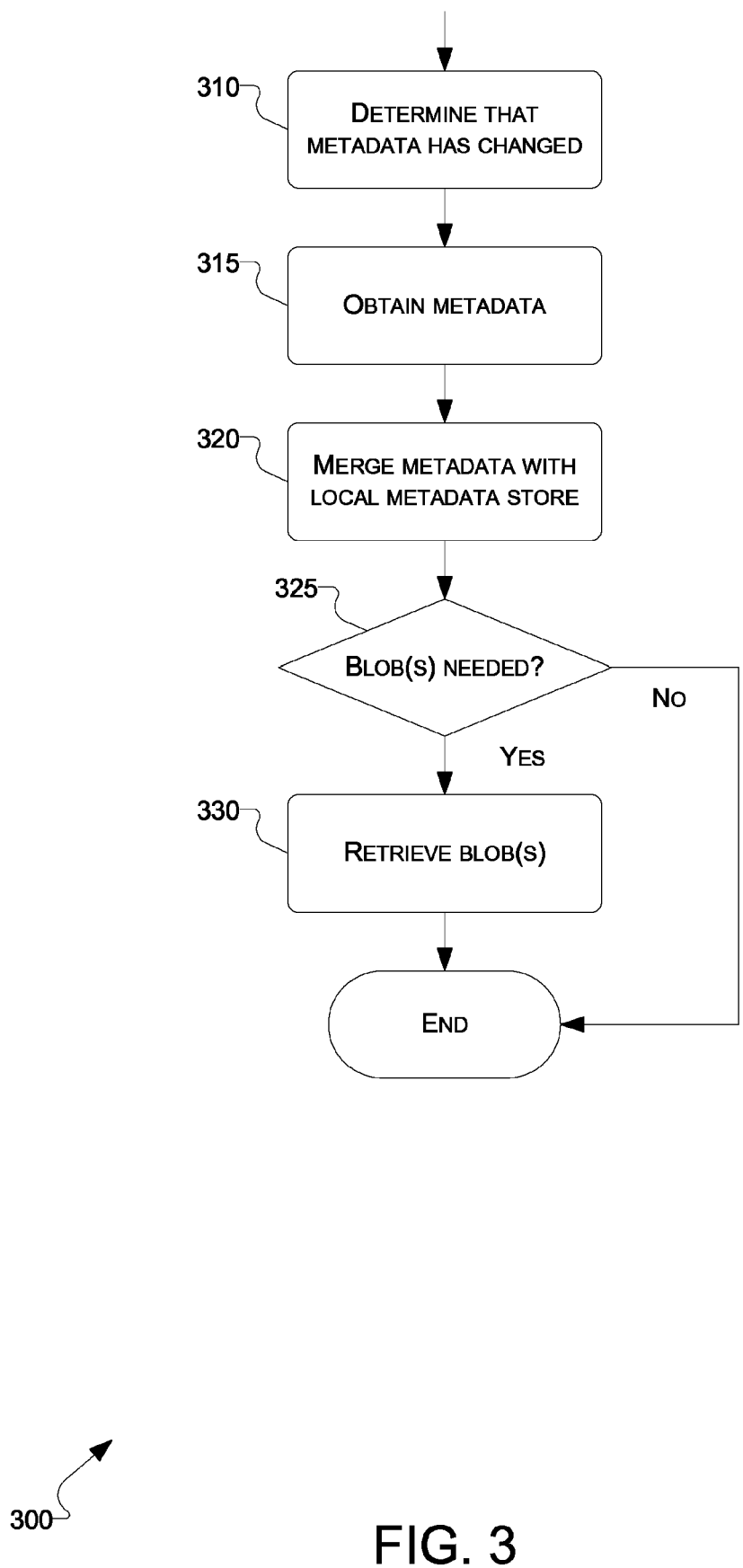
FIG. 3 illustrates an exemplary generalized operational flow including various operations that may be performed by an endpoint, including a device endpoint, when synchronizing data from another endpoint.

Turning now to FIG. 3, shown therein is an exemplary generalized operational flow 300 including various operations that may be performed by an endpoint, including a device endpoint, when synchronizing data from another endpoint. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 310, an endpoint may determine that metadata in which the endpoint has some interest has changed. For example, the endpoint may have previously updated the same metadata and registered to be notified of future changes, perhaps in a manner like that described previously with reference to FIG. 2. In this case, or in other cases, such an endpoint may receive a notification from some other endpoint, including from a server endpoint that maintains a copy of the metadata. In another implementation, an endpoint may periodically poll some location and determine through the act of polling that the metadata at that location has changed. In yet other implementations, this operation may not be performed—in such an implementation, an endpoint might, for example, periodically execute at least some of the other operations in the exemplary operational flow 300—such as obtaining metadata and merging metadata—regardless of whether the metadata has changed. (The description associated with this operational flow may in some cases assume that a change exists in the metadata in question—in the case where no change actually exists, a variety of the operations may be executed differently or perhaps may not be executed at all).

In at least some implementations of operation 315, the endpoint may obtain the metadata that may contain a change through a variety of means. For example, an endpoint, including perhaps a device endpoint like the device endpoint A 160 described previously with reference to FIG. 1, might initiate an HTTP GET request to a web server that is part of or associated with a server endpoint, such as perhaps the server endpoint 110 also described previously with reference to FIG. 1, and receive in response metadata that includes one or more changes. In other implementations, the metadata may be proactively communicated by another endpoint, or may be obtained in a variety of other ways. In some implementations, the obtained metadata may include all items that may be represented by the particular piece of metadata, while in the same or other implementations, in at least some cases, the metadata may only include a subset of the items, including, for example, only the items that have changed.

In an exemplary implementation of operation 320, the obtained metadata may be merged with a copy of the metadata maintained locally. Such a merge operation may incorporate the changes embodied in the obtained metadata into another copy of the metadata that may be maintained or modified by the endpoint that executes the operational flow 300. Such a local copy of the metadata, or local metadata store, may be maintained in a variety of ways, including (at least in some implementations) as rows or records in a database, as a copy of an XML feed (or other) document that might exist in one or more files in a file system, and so on.

In implementations where the metadata includes SSE information, such a merge operation may be implemented using an SSE merge. In a simplified description of one way of implementing an SSE merge, a process specified by SSE may be followed that compares "foreign" items—those that are embodied by the obtained metadata in this example—with "local" items that are maintained locally or associated with the endpoint merging the metadata. New foreign items that don't exist in the local metadata store may generally be incorporated into the local metadata store, thereby creating a new local item. Where a foreign item corresponds to a local item—perhaps because both items have the same SSE identifier—a merge process may choose a "winning item" and "losing item" using one or more means, such as by choosing the winning item to be the item that has been updated more recently. Finally, when the local item is not the winning item, the local item may be updated so that it incorporates the data embodied by the winning item.

In at least some implementations of operation 325, it may be determined whether the endpoint that is synchronizing information and that has obtained the metadata also requires or desires one or more blobs referenced or identified by the metadata. For example, in implementations where the metadata doesn't include at least some information associated with the metadata, and instead might, for example, include one or more references to blobs of data stored elsewhere, this operation may determine that one or more of those blobs are desired or required. Such might be the case, in just one example, when at least part of the objective of the operational flow 300 is to synchronize both metadata and associated blob data to the endpoint that is executing the operational flow 300. If a blob is needed, the exemplary operational flow may proceed to operation 330. If no blobs are needed, the exemplary operational flow may end.

In an exemplary implementation of operation 330, one or more blobs that are identified or referenced by the obtained metadata may be retrieved. The blob or blobs to retrieve may be identified in a variety of ways. For example, in some cases any blobs associated with changed metadata items may be retrieved. In other implementations, only a subset of the changed blobs may be retrieved—perhaps only blobs that are under a specific size might be retrieved, or some other criteria might be used to filter or determine the blob or blobs to retrieve. In some implementations, a single metadata item may identify a single blob, while in the same or other implementations, a single metadata item may identify multiple blobs. Each identified blob may then be retrieved in one or more different ways. In some implementations, one or more alternate representations of identified blob(s) may be retrieved, such as transcoded versions of particular files (such as image, video, or audio files), and so on. Finally, in some implementations, a blob may be retrieved using operations that are the same as or similar to the operations described below with reference to FIG. 4. In other implementations, a blob may be retrieved in one or more different ways.

Figure 4:
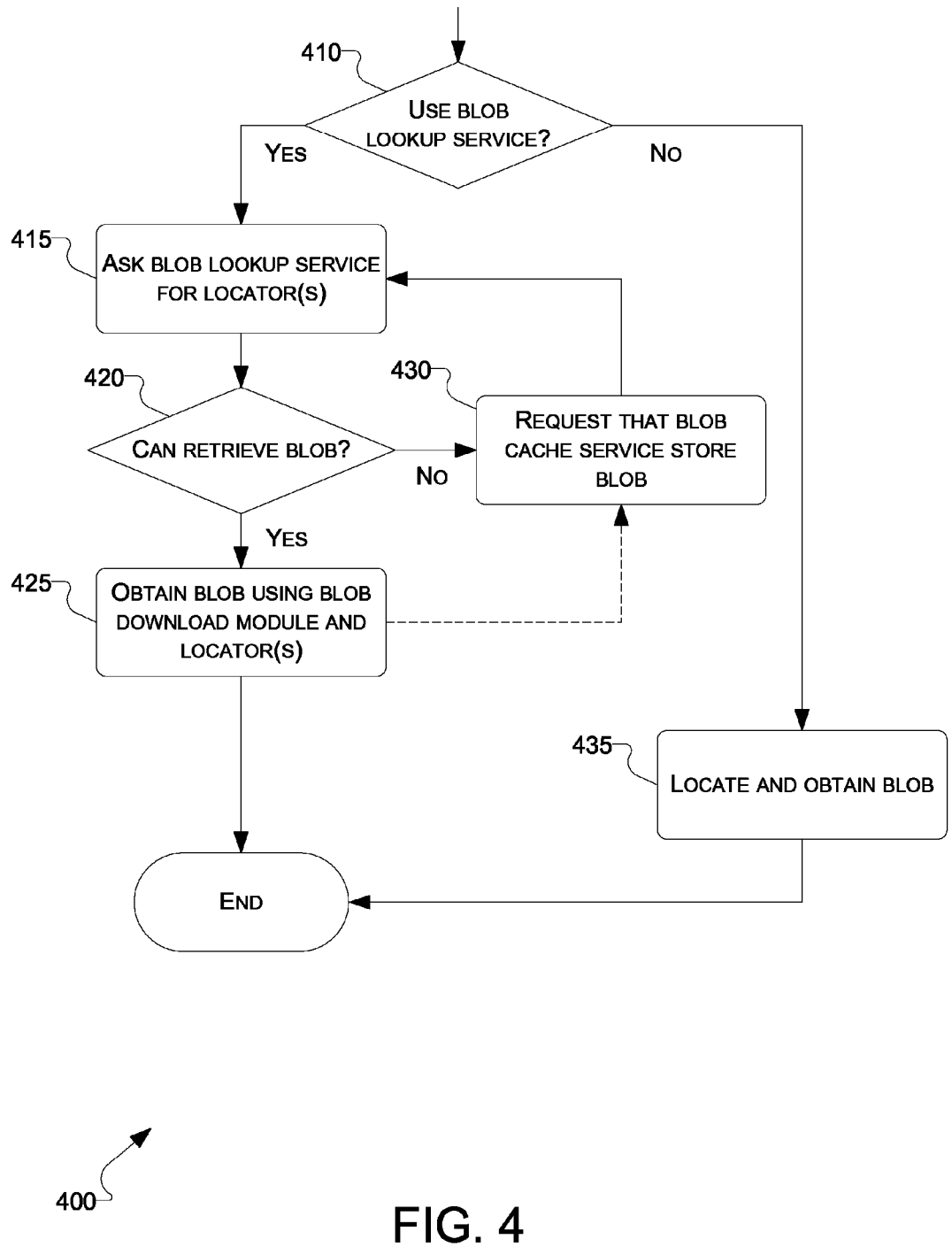
FIG. 4 illustrates an exemplary generalized operational flow including various operations that may be performed to retrieve or download a blob.

Turning now to FIG. 4, shown therein is an exemplary generalized operational flow 400 including various operations that may be performed to retrieve or download a blob. The following description of FIG. 4 may be made with reference to other figures. However, it should be understood that the operational flow described with reference to FIG. 4 is not intended to be limited to being used with the elements described with reference to these other figures. In addition, while the exemplary operational flow of FIG. 4 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 410, it may be determined if a blob lookup service (or BLS) will be used as part of retrieving the blob. For example, this determination may be made, at least in part, because in some implementations an endpoint may attempt to retrieve the blob first without using (or by using) a blob lookup service. In such an implementation, a blob lookup service might, for example, only be used after an initial attempt to retrieve the blob without using the blob lookup service is made. If such an initial attempt fails, then a blob lookup service might be used. In another implementation, a blob lookup service may not be available, or the determination may be made in a variety of other ways. If a blob lookup service is used, the operational flow 400 may proceed to operation 415. If a blob lookup service is not used, the operational flow may proceed to operation 435.

If a blob lookup service is used, the operational flow 400 may proceed to operation 415, where, in an exemplary implementation, an endpoint may ask or query a blob lookup service for one or more locators associated with the desired blob. Such a query may be communicated to a blob lookup service using a variety of communication mechanisms or means. In some implementations, additional information may also be included in the request. For example, in some implementations, an endpoint may also request that a particular blob be provided in one or more alternate representations. For example, a mobile phone might request a representation of a blob that occupies a relatively smaller amount of space (so that it is easier to transfer over a potentially slow network connection, is easier to store on a device with limited storage space, and so on).

In response to such a request, the blob lookup service may provide one or more "locators," where a locator may generally comprise an identification of an endpoint that may be able to provide at least a portion of the blob. For example, in one implementation a blob lookup service might provide one or more locators that each in turn comprise a domain name or IP address that identifies one or more endpoints that the blob lookup service has determined may be able to provide at least a portion of the requested blob.

In at least some of such implementations (although not necessarily in all implementations), as well as in other implementations, the one or more locators provided by a blob lookup service might also include other information. For example, in some cases a locator might include information that might be used, at least in part, to determine the manner in which the endpoint identified by the locator should be contacted or the manner in which the blob should be retrieved. For example, a locator might include some indication of supported protocols that might be used, such as some kind of peer-to-peer or distributed data transfer mechanism, HTTP, FTP, and so on. In the same or other cases, the one or more locators might include some indication of preference or order that might identify a particular locator or locators as being preferred—such preferred locators might be used first and before other locators are used, for example.

In the same or other implementations, only portions or parts of a particular blob may be available from a particular endpoint. For example, the first 50% of a particular blob may be accessible using a particular endpoint while the last 50% of the same blob may be accessible using another endpoint. In such implementations, a locator may in some cases include information that indicates what portions of a blob may be provided by the particular endpoint associated with the locator.

In the same or yet other implementations, a locator may include information derived or provided by some type of knowledge, such as knowledge made available by an exemplary knowledge store module 145, described previously with reference to FIG. 1. Such knowledge may, for example, enable the blob lookup service that provides one or more locators to indicate a preference for the use of particular locators (because perhaps those locators identify endpoints that have faster connections, are physically or logically closer to the endpoint requesting the locators, and so on), or may enable the blob lookup service to modify or change the locators it provides in a variety of other ways.

It should also be noted that while a locator may contain additional information, including as described previously, in some of the same cases or implementations a provided locator may not include any additional information. In such cases, and in other cases, other operations—including those not shown—may determine how to retrieve the blob through other means such as by a negotiation process with the endpoint identified in a locator to determine a communication or transfer protocol to use, and so on.

In at least some implementations of operation 420, it may be determined whether the provided locator(s) can be used to retrieve the blob. For example, the endpoint identified in a locator may be queried or a request may be sent to retrieve the blob, to initiate blob retrieval, the check the status or availability of the blob, and so on. If a determination can be made that the blob cannot be retrieved—perhaps the locator identifies an endpoint that is offline, for example, or the blob cannot be retrieved for some other reason—then in at least some implementations the operational flow 400 may proceed to operation 430. If one or more of the locators can be used to retrieve the blob, the operational flow may proceed to operation 425.

In an exemplary implementation of operation 425, the locator(s) may be used to retrieve the blob. This operation may be implemented in a wide variety of manners depending on a variety of characteristics including, but not limited to, the information provided in the locator(s), the supported or available communication or file transfer protocols, and so on. In some implementations, retrieving the blob may be implemented, at least in part, through the use of a blob download module that might be similar to or the same as the blob download module 150 and the blob download module 162 described previously with reference to FIG. 1.

For example, in an implementation that uses an exemplary blob download module, the endpoint might provide the locator(s) to the blob download module, and the blob download module might then evaluate the information in the locator(s) and use the information to determine one or more ways to retrieve or download the requested blob. In a relatively simple case, an endpoint or blob download module might simply use a single locator to locate another endpoint that has the blob, send some type of network communication—such as perhaps an HTTP GET or file system file retrieval request—to the identified other endpoint, and receive the requested blob in response. In such an implementation, and in other implementations, if such a request does not succeed or is determined to be less preferable for some reason (perhaps the connection is slow, for example), one or more other locators may also or instead be used.

In another implementation, an endpoint or blob download service might use multiple locators to initiate multiple requests to different endpoints, including perhaps separate requests for different (or the same) portions of a single blob. In some cases obtaining different portions of the same blob from multiple endpoints may enable the retrieval of the blob to be completed more quickly, or with less impact on any particular single endpoint, or may have other advantages.

In at least some blob retrieval implementations or operations, one or more techniques may be used to minimize the amount of data to be transferred or to otherwise further optimize the retrieval of the blob. For example, some implementations may use data compression—such as ZIP, or other compression techniques—to retrieve less data. In the same or other implementations, only portions of the blob that have changed from a copy of the blob that might already exist on the requesting endpoint may be requested or communicated from or one or more other endpoints. Such "differential compression" may enable only small amounts of data to be communicated even when the blob in which the changed data exists is relatively large.

In some implementations, the endpoint may inform another service or endpoint about the status of the blob retrieval or download. For example, an endpoint might inform a blob lookup service that it has retrieved some or all of a particular blob. Using such information, the blob lookup service may be able to provide a locator that identifies the endpoint as part of servicing some other request for the same blob. In some cases an endpoint that provides this information may do so only when the blob is completely retrieved, while in other cases or implementations the endpoint may periodically provide information as the blob is retrieved, so that, for example, a blob lookup service is updated when 25% of the blob has been retrieved, when 50% of the blob has been retrieved, and so on. In the same or other implementations, the information communicated to another endpoint might include an identification of which portions of the blob have been retrieved—say, that the first 50% of a blob has been retrieved, that the first 10% and the last 10% of the blob has been retrieved, or so on—and such identification may in turn be useful to enable other endpoints to retrieve portions of the same blob from different endpoints.

If the retrieval of the blob fails during the execution of operation 425, in some cases the operational flow may end. In other implementations, a retrieval failure may be interpreted similarly to or in the same way as a failure of the previously described operation 420. In such an implementation, if the blob retrieval fails during operation 425, the operational flow may proceed to operation 430 (such a path is illustrated in FIG. 4 using a dashed line).

If the blob cannot be retrieved for one or more of a variety of reasons, the operational flow 400 may in some cases proceed to operation 430. Such reasons for executing operation 430 may include those described above, such as when the endpoints identified by the blob lookup service cannot provide the blob, perhaps because they are not online or available. In an exemplary implementation of operation 430, the endpoint may request that a blob cache service retrieve and cache a copy of the requested blob. In some implementations, such a blob cache service may be accessed more reliably than at least some other endpoints, and so may serve as a useful interim or transient location for a blob that an endpoint that wants to retrieve the blob can use instead of some other (perhaps unavailable) endpoint.

In some of such implementations, the blob cache service may accept the request and retrieve the blob itself when possible. For example, the blob cache service may wait until an originally identified endpoint is available and may then retrieve the blob from the original endpoint (or may instruct the endpoint to upload the blob). Some exemplary blob cache service implementations and operations that might be performed by a blob cache service are described elsewhere herein, especially with reference to FIG. 1 and FIG. 7.

In some implementations, an endpoint that requests that a blob be stored by a blob cache service may later again execute operation 415 and query the blob lookup service for locators that may be used to retrieve the blob. For example, the endpoint might receive a notification (perhaps from something like the notification service 140 described previously with reference to FIG. 1) that the blob cache service can provide the desired blob. If the blob cache service has stored the blob, it may have already informed the blob lookup service that it has the blob, and so the blob lookup service may provide the requesting endpoint a locator that identifies the blob as being available using the blob cache service. Ultimately, the original endpoint may retrieve the blob from the blob cache service.

In other implementations, other endpoints, including other more reliable or available endpoints—like perhaps a cloud storage service like that described previously with reference to FIG. 1—may be used instead of a blob cache service as a location from where the endpoint may retrieve the blob.

If a blob lookup service has been determined to not be used, for example, as part of operation 410, then the operational flow 400 may proceed to operation 435, where the blob may be retrieved using a variety of other mechanisms that may not use a blob lookup service. For example, in some implementations one or more endpoints may attempt to retrieve a blob using some store that might not be associated with or known to a blob lookup service. In such a case, or in other cases, the blob may be retrieved using any of a variety of mechanisms, including those described previously, such as HTTP, FTP, peer-to-peer "BitTorrent"-style communications, or other mechanisms. In addition, functionality made available elsewhere—like functionality provided by a blob cache service or other server functionality—may also be used in at least some implementations that do not use a blob lookup service.

It should be noted that in some implementations other methods for retrieving blobs may be used instead of or in addition to the exemplary operational flow described previously and with reference to FIG. 4. At least some of these other methods may also execute one or more of the exemplary operations described with reference to FIG. 4 or may use one or more other modules or services including modules and services described with reference to, for example, FIG. 1. At least some of these other methods may also execute other instructions or use other modules and services. As just one example, an endpoint might request that a blob download module—perhaps like the blob download module 150 or blob download module 162 described previously with reference to FIG. 1—obtain a particular blob. In some implementations, the blob download module might have one or more pluggable "drivers" that each may locate and/or obtain the requested blob perhaps in different ways. For example, one driver might use a blob lookup service to obtain a set of locators and then use a single locator to retrieve the blob, another driver might also use a blob lookup service and might use multiple locators—perhaps in parallel, or with a BitTorrent or other similar type of mechanism—to retrieve the blob, yet another driver might not use a blob lookup service and might locate and retrieve the blob in a variety of other ways, and so on. In at least some of such implementations, the blob download module might determine the driver to use in a variety of ways. For example, the blob download module might query each driver for an estimate of how long the driver might take to retrieve the blob and each driver might then return an estimated time or perhaps some value that indicates that the driver cannot retrieve the blob. Using such returned data, the blob download module might pick one (or more) drivers and instruct the chosen driver(s) to actually retrieve the blob.

Figure 5:
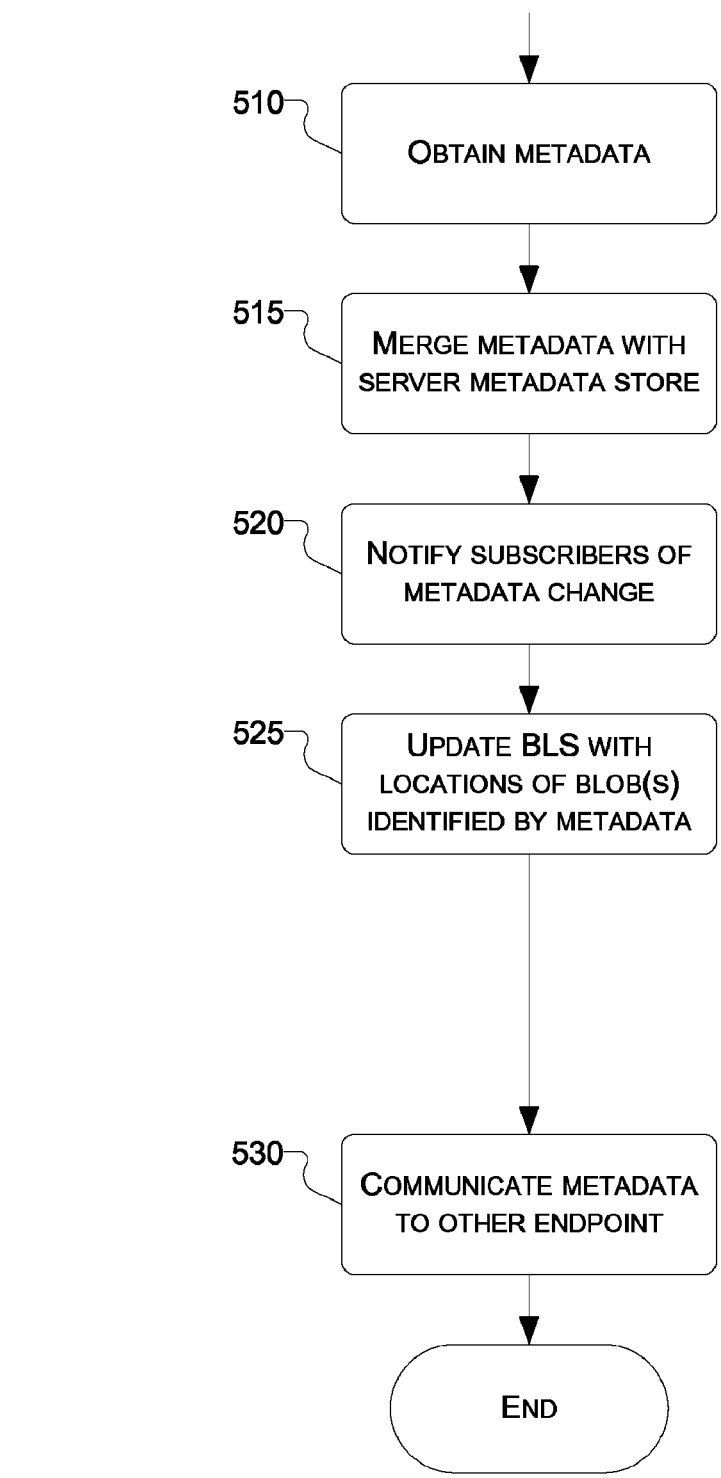
FIG. 5 illustrates an exemplary generalized operational flow including various operations that may be performed when maintaining and providing metadata.

Turning now to FIG. 5, shown therein is an exemplary generalized operational flow 500 including various operations that may be performed when maintaining and providing metadata. The following description of FIG. 5 may be made with reference to other figures. However, it should be understood that the operational flow described with reference to FIG. 5 is not intended to be limited to being used with the elements described with reference to these other figures. In addition, while the exemplary operational flow of FIG. 5 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 510 an endpoint, such as a server endpoint 110 described previously with reference to FIG. 1, may obtain metadata from another endpoint. For example, the endpoint that obtains the metadata may in some implementations be the server endpoint that receives metadata with changes communicated by other endpoints, as was previously described, for example, with reference to operation 215 of FIG. 2. Furthermore, in some implementations, at least some of the operations described herein with reference to the operational flow 400 may be implemented by an exemplary storage service 120, also as described previously with reference to FIG. 1. (While some of this description may refer to the endpoint that receives the metadata in the operational flow 400 as a "server endpoint," it should be understood that the endpoint receiving the metadata does not necessarily need to be a server endpoint, does not necessarily need to have at least some or all of the functionality described elsewhere as possibly associated with a server endpoint, and so on).

Metadata may be obtained using any of a variety of communication mechanisms suitable for communicating metadata. For example, in some implementations an HTTP server associated with the receiving or obtaining endpoint may accept HTTP POST requests that contain metadata at a certain URL. In the same or other implementations, another endpoint might communicate the metadata using another protocol, like FTP or one or more file sharing protocols, email, and so on. In some implementations, a receiving endpoint may proactively retrieve the metadata rather than rely on another endpoint to submit the metadata. For example, the obtaining endpoint might initiate an HTTP GET request to some other endpoint and be supplied with the metadata in a response.

In at least some implementations of operation 515, the obtained metadata may be merged with a copy of the metadata maintained by the server endpoint. Such a merge operation may result in the incorporation of the changes embodied in the obtained metadata into another copy of the metadata that may be maintained and modified by the endpoint that executes the operational flow 500. Such a local copy of the metadata may be maintained in a variety of ways, including (in at least some implementations) as rows or records in a database, as a copy of an XML feed (or other) document, and so on. In implementations that use metadata that includes SSE information, the obtained metadata may be merged with the local metadata using SSE merge techniques. In some implementations such SSE merge techniques may be the same as or similar to the SSE merge techniques described previously with reference to, especially, operation 320 of FIG. 3.

In an exemplary implementation of operation 520, one or more endpoints that have previously registered or subscribed to be notified when the metadata in question changes may be notified using one or more notification means. (After receiving such a notification, an endpoint might in some implementations initiate the execution of operations to obtain the newly updated metadata from the server endpoint and merge the changes in the newly updated metadata with that endpoint's own local metadata store. Such operations might include, perhaps, at least some of those described previously with reference to FIG. 3.) In at least some other implementations, including those that do not provide notifications, no subscribers may be notified.

In some implementations of operation 525, a blob lookup service may by updated with location information for a blob or blobs identified by the obtained metadata, so that endpoints that obtain or use the metadata may be able to retrieve blobs referenced by or associated with the metadata. That is, for example, suppose the obtained metadata comprises a new item that references a new blob. It may be that when the operational flow 500 is executed that the referenced blob exists only on the endpoint that generated and communicated the updated metadata to the server endpoint. In order for any endpoint—including the server endpoint or other device endpoints—to be able to retrieve the blob, the (initial) location of the blob may be stored by a blob lookup service, including a blob lookup service like the blob lookup services described elsewhere herein.

Finally, in an exemplary implementation of operation 530, the updated metadata created as part of the merging operation 515 may be communicated to one or more endpoints. For example, another endpoint that synchronizes the data represented by the metadata may submit a request to the server endpoint for updated metadata. Such a request might be submitted after the other endpoint receives a notification that the metadata has changed, when the other endpoint polls the server endpoint and discovers that the metadata has changed, and so on. The server endpoint may provide the metadata to the other endpoint in a variety of ways, including those described previously and elsewhere herein, such as through the use of HTTP GET or POST requests and responses, file sharing protocols, FTP, email, some other communication mechanism or mechanisms, and so on.

Figure 6:
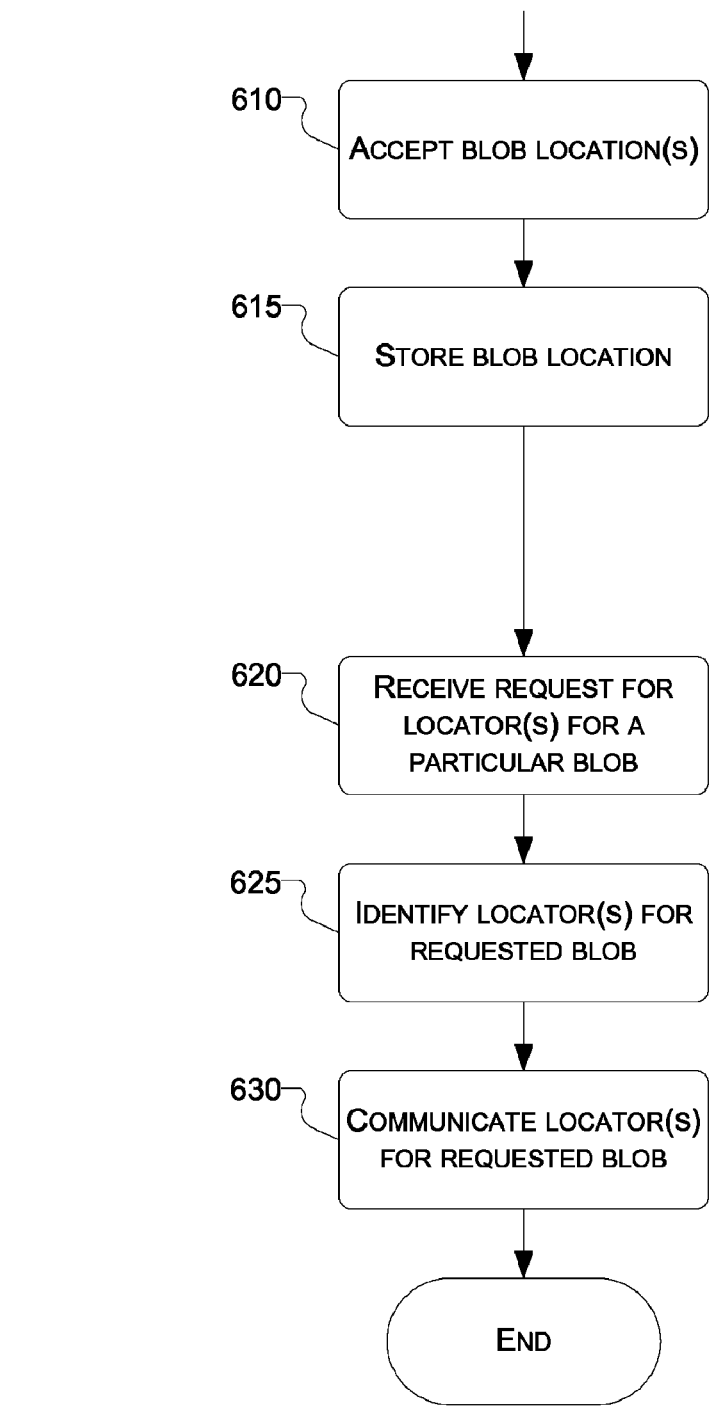
FIG. 6 illustrates an exemplary generalized operational flow including various operations that may be performed when storing and providing locations and locators associated with blobs referenced by metadata.

Turning now to FIG. 6, shown therein is an exemplary generalized operational flow 600 including various operations that may be performed when storing and providing locations and locators associated with blobs referenced by metadata. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 610, an endpoint may accept one or more locations associated with a particular blob. In general, the locations may specify an endpoint where at least part of a particular blob may be retrieved. In at least some implementations, the blob or blobs may be identified using one or more blob identifiers. An endpoint that accepts one or more locations might include at least some server endpoints, such as the exemplary server endpoint 110 described previously with reference to FIG. 1. Furthermore, at least some of the operations associated with the operational flow 600 may be implemented in at least some implementations by a blob lookup service, such as the exemplary blob lookup service 125 also described previously with reference to FIG. 1. While some of the operations of the operational flow 600 may be described herein as associated with an exemplary server endpoint or exemplary blob lookup service, it should be understood that the operations do not necessarily need to be implemented or executed by a server endpoint or blob lookup service and may instead be implemented or executed by one or more of a variety of endpoints, or modules or services included in those endpoints.

The one or more blob locations may be accepted or retrieved from a variety of other endpoints and processes. For example, when a server endpoint or storage service processes metadata from another endpoint, it may provide this operation with one or more locations associated with one or more blobs identified by the metadata it has received (such an action might be associated with, for example, the operation 525 previously described with reference to FIG. 5). In another example, when an endpoint obtains some or all of a blob from one or more other endpoints, perhaps as part of synchronizing the metadata and blobs associated with the metadata, including through the use of operations described previously with reference to FIG. 4, that endpoint might also update a blob lookup service with its location so that other endpoints may be able to retrieve some or all of the blob from the endpoint that has now also obtained the blob (in addition to receiving it from the endpoint where it was initially created, say).

In addition to a location of the endpoint that now has at least a part of the blob, the endpoint that updates the blob lookup service might also provide other information to the blob lookup service. Such other information might include, for example, an identification of the part (or parts) of the blob available at the particular endpoint (or an indication that the entire blob is available), some indication that the particular endpoint may be able to provide one or more alternate representations of the blob, and so on.

In at least some implementations of operation 615, the accepted location (and possibly other accepted data), may be stored by the blob lookup service using one or more of a variety of means or mechanisms, including as rows or records in a database, and so on.

In an exemplary implementation of operation 620, the blob lookup service may receive a request for locators associated with one or more blobs. Such requests may be sent or communicated from a variety of endpoints, modules, or services. For example, a device endpoint might submit a request for a locator for a particular blob so that the device endpoint may be able to synchronize a blob identified by particular metadata. (The device endpoint may then use any returned locators to actually retrieve the blob.) In another example, a blob cache service or cloud storage service might request locators so that the blob cache service or cloud storage service may be able to retrieve one or more blobs.

In some implementations of operation 625, the blob lookup service may identify one or more locators associated with the particular requested blob. In some implementations this operation may be executed, at least in part, by looking up a particular blob (perhaps using a blob identifier associated with the blob), and identifying a locator for every endpoint that is registered as being able to provide the requested blob. For example, if three endpoints have previously registered as having a requested blob, then this operation might identify three locators, one for each of the three endpoints.

In some implementations, the identified locators may also include additional information aside from just a means for identifying an endpoint associated with the blob. For example, some locators may include information about which parts or portions of the blob may be retrieved from the particular endpoint, the same or other locators may include information about one or more communication protocols that may be used with the particular endpoint to retrieve the blob, and so on.

While in some implementations a blob lookup service may simply, for example, identify a locator for each and every endpoint that may provide a particular blob, in other implementations the process of identifying locators may, for example, use additional information or knowledge. For example, a blob lookup service might use a variety of knowledge about the metadata, about the server endpoint(s) and device endpoint(s), and so on, to filter, prioritize, or otherwise identify (perhaps the most suitable) locators. In some implementations, such knowledge may be provided, at least in part, by a knowledge store such as the exemplary knowledge store module 145 described previously with reference to FIG. 1.

For example, suppose that multiple endpoints have previously registered as being able to provide portions of a particular blob. Further suppose that a knowledge store has knowledge that one of the providing endpoints is implemented by a workstation-class desktop computer that is often connected to a network using a high-speed and high-bandwidth network connection; that another of the providing endpoints is a laptop computer that connects using a variety of networks with differing connection characteristics; and that a third providing endpoint is a mobile phone that is often turned on and connected to a network but that uses a relatively slow connection where data transmission is associated with per-unit monetary charges. In such an example, at least some implementations of operation 625 may use this knowledge, as well as possibly other knowledge, to filter or prioritize the identified locator or locators. For example, in one implementation locators for all three endpoints might be identified, but they may include or be communicated with priority information that indicates that the desktop computer should be used first, the laptop computer should be used next, and that the mobile phone should only be used as a last resort. In another example, the identified locators might not even include particular endpoints, such as the mobile phone in this example—instead, only locators for the desktop and laptop computers may be identified.

Other information or criteria may also be used to identify one or more locators, and even possibly to determine if any locators at all should be returned. For example, suppose that the metadata includes an item that references a blob that has been determined to be dangerous, not appropriate, or for some reason undesirable—for example, the blob might contain executable code that contains a virus, might contain video data with objectionable content, and so on. In such a case, an implementation of operation 625 might identify no locators for the particular blob, even if one or more endpoints have registered to be able to provide the blob in question. In such a way, the blob lookup service may be used to filter or control the content that may be transmitted when synchronizing or communicating data. Such control may be difficult or impossible to implement in, for example, a decentralized or peer-to-peer synchronization system where endpoints may exchange data with potentially no involvement by a centralized endpoint.

Finally, in an exemplary implementation of operation 630, the locator or locators identified, for example, in operation 625, may be communicated or provided to one or more endpoints, including an endpoint that made the request received as part of operation 620.

Figure 7:
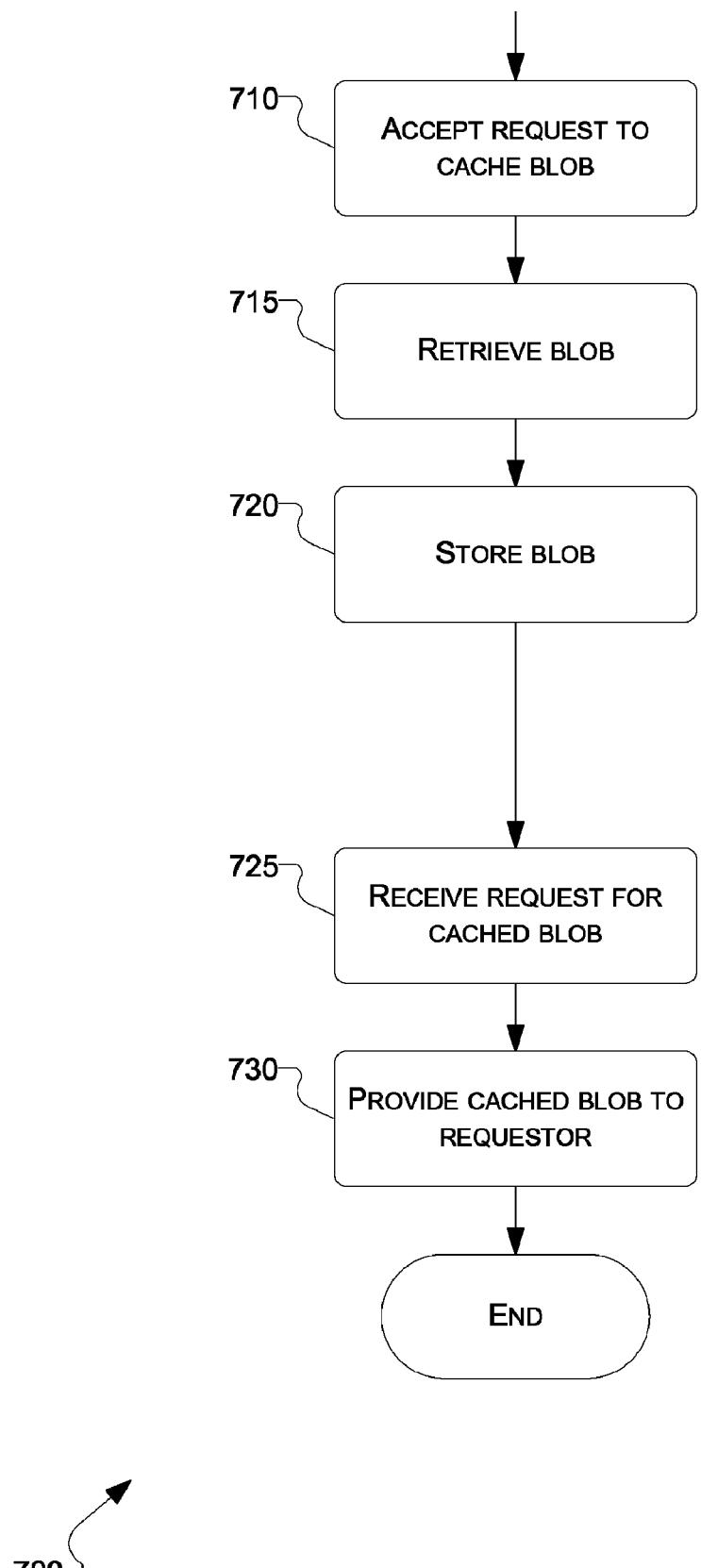
FIG. 7 illustrates an exemplary generalized operational flow including various operations that may be performed when storing blobs in a cache and providing blobs from a cache.

Turning now to FIG. 7, shown therein is an exemplary generalized operational flow 700 including various operations that may be performed when storing blobs in a cache and providing blobs from a cache. The following description of FIG. 7 may be made with reference to other figures. However, it should be understood that the operational flow described with reference to FIG. 7 is not intended to be limited to being used with the elements described with reference to these other figures. In addition, while the exemplary operational flow of FIG. 7 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 710, an endpoint may accept or receive a request to store or cache a particular blob. An endpoint that receives such a request might include at least some server endpoints, such as the exemplary server endpoint 110 described previously with reference to FIG. 1. Furthermore, at least some of the operations associated with the operational flow 700 may be implemented in at least some implementations by a blob cache service, such as the exemplary blob cache service 130 also described previously with reference to FIG. 1. While some of the operations of the operational flow 700 may be described herein as associated with an exemplary server endpoint or exemplary blob cache service, it should be understood that the operations do not necessarily need to be implemented or executed by a server endpoint or blob cache service and may instead be implemented or executed by one or more of a variety of endpoints, or modules or services included in those endpoints.

A request to cache a particular blob might be received from a variety of endpoints, including both server endpoints and device endpoints. For example, a device endpoint might submit a request to cache a blob when, in one example, it is unable to obtain that blob itself from another endpoint (as might be the case for example and as described previously, when two device endpoints are not online at the same time). In another example, a storage service or other service or module might submit a request to cache a particular blob for one or more of a variety of reasons. For example, perhaps using knowledge maintained by a knowledge store like the knowledge store module 145 described previously with reference to FIG. 1, a storage service might have knowledge that a particular endpoint is often unavailable. In such a case, and possibly in other cases, when such an endpoint provides metadata associated with new or changed blobs, the storage service might proactively—even before another endpoint requests the blob—request that the particular blob or blobs be cached. Such an implementation might make it unnecessary for a device endpoint that wants to retrieve such a blob to make a request to cache the blob itself.

In some implementations of operation 715, the blob cache service may retrieve the requested blob. Retrieving a blob may be implemented in a variety of ways. In some implementations, the blob cache service may execute one or more operations that are the same as or similar to those described previously with reference to FIG. 4. Such operations might, for example, use a blob lookup service to identify one or more locations at which the blob is available and might retrieve the blob from such locations.

In the same or other implementations, endpoints may periodically communicate with the blob cache service, or may receive notifications that a communication with the blob cache service is necessary, and may provide or upload blobs that the blob cache service requests. For example, a device endpoint might receive a communication or notification that a particular blob available on the device endpoint is desired by the blob cache service, and so might make the blob available for retrieval by the blob cache service as part of operation 715, or might proactively upload or provide the blob to the blob cache service as part of another implementation of operation 715.

The blob cache service may in some implementations use knowledge about the synchronization system, metadata, endpoints, and so on—including knowledge maintained by a knowledge store such as the exemplary knowledge store 145 described previously with reference to FIG. 1—to more efficiently retrieve blobs that are to be cached. In just one example, a blob cache service might not immediately attempt to cache a blob requested by some other endpoint. Instead, the blob cache service might wait until, say, there is free bandwidth available to the one or more endpoints that may provide the blob, or until there is relatively cheap bandwidth available, or until endpoints that have sufficient computing power to service the request are available, and so on.

In an implementation of operation 720, the retrieved blob may be stored using any of a variety of storage mechanisms or means. In some implementations, blobs may be stored in a database, may be stored as files in a file system, or may be stored in some other manner. In at least some implementations, a blob cache service may use a variety of caching techniques to determine, for example, how long a particular blob should be stored. For example, one implementation of a blob cache service might store blobs until its available storage space is full, and might then use one or more algorithms—including LRU algorithms—to determine which blobs to delete so that space is available for additional blobs. In some implementations, blobs that have been retrieved or accessed recently might be kept while blobs that have not been retrieved recently may be deleted. In the same or other implementations blobs may be associated with a reference count that defines how many endpoints may want to retrieve the blob and a blob may be deleted in some cases when the specified number of endpoints have retrieved the blob. In the same or yet other implementations a variety of other techniques and algorithms may be used to manage the storage associated with the blob cache service.

In at least some implementations, the blob cache service may update an exemplary blob lookup service with a location associated with the blob cache service when the blob cache service has stored at least a portion of a particular blob and can provide the stored portion of the blob to other endpoints. Using such a location, a blob lookup service may be able to provide a locator that is associated with the blob cache service to an endpoint, and such an endpoint may be able to thereby retrieve a blob from the blob cache service. In some implementations, endpoints may also be able to retrieve blobs from the blob cache service without the use of a blob lookup service.

In an exemplary implementation of operation 725, at some point after a particular blob or blobs are cached, the blob cache service may receive a request from one or more endpoints for all or a portion of a cached blob and may, in an exemplary implementation of operation 730, provide the requested blob (or portion of the blob) to the requestor. Requests and responses associated with cached blobs may be implemented in a wide variety of manners, using a wide variety of communication mechanisms, and so on, including mechanisms described elsewhere herein such as HTTP transfers, FTP transfers, BitTorrent-style transfers, and so on.

Figure 8:
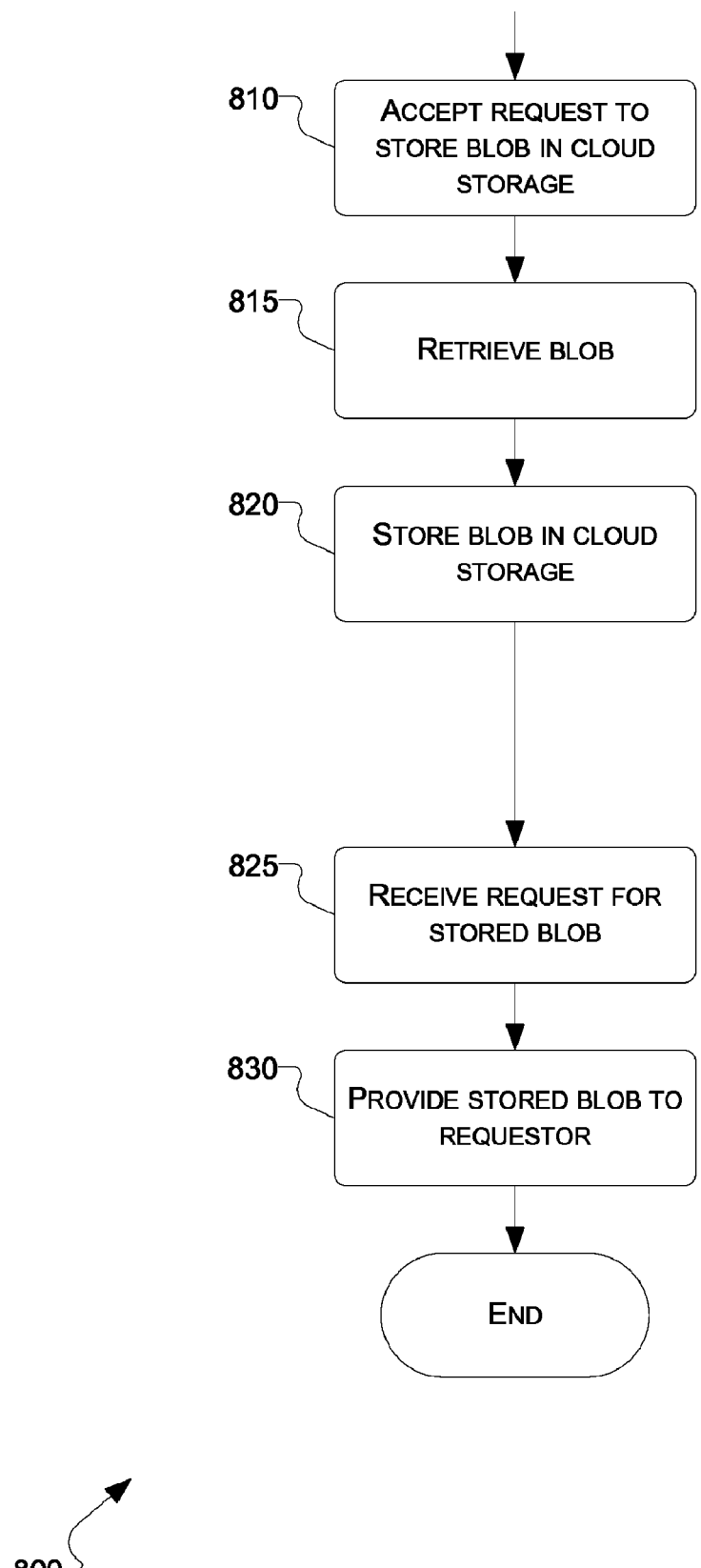
FIG. 8 illustrates an exemplary generalized operational flow including various operations that may be performed when storing blobs in cloud storage and providing blobs from cloud storage.

Turning now to FIG. 8, shown therein is an exemplary generalized operational flow 800 including various operations that may be performed when storing blobs in cloud storage and providing blobs from cloud storage. The following description of FIG. 8 may be made with reference to other figures. However, it should be understood that the operational flow described with reference to FIG. 8 is not intended to be limited to being used with the elements described with reference to these other figures. In addition, while the exemplary operational flow of FIG. 8 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 810, an endpoint may accept or receive a request to store some or all of a particular blob "in the cloud" or in cloud storage. The endpoint or module or service that accepts this request may be implemented in some cases by a server endpoint, perhaps like the server endpoint 110, and at least some of the operations associated with the operational flow 800 may be implemented or provided by an exemplary cloud storage module 135, both of which were previously described with reference to FIG. 1. While some of the operations of the operational flow 800 may be described herein as associated with an exemplary server endpoint or exemplary cloud storage service, it should be understood that the operations do not necessarily need to be implemented or executed by a server endpoint or cloud storage service and may indeed be implemented or executed by one or more of a variety of endpoints, or modules or services included in those endpoints.

While many of the operations in the operational flow 800 might appear similar to those described in the blob cache service operational flow 700, a cloud storage service may be used differently than a blob cache service. For example, in contrast to the transient storage provided by a blob cache service, a cloud storage service might provide non-transient or "reliable" storage for blobs (and perhaps other data) by, for example, not deleting stored blobs unless specifically directed by, for example, a user; by maintaining multiple copies of stored data, perhaps on separate disk drives or other storage mechanisms; and so on.

In at least some implementations of operation 815, the cloud storage service may retrieve or be provided with blob data, including in some cases with a portion of or the entirety of the blob associated with the request that may have been received in operation 810. The cloud storage service might retrieve the blob in a variety of ways, including in some cases by using a blob lookup service, blob download module, or possibly some of the operations described previously, for example, with reference to FIG. 4. In other implementations the cloud storage service might retrieve or be provided with the blob using any of a variety of other communication or file transfer mechanisms. In at least some implementations, knowledge of the communication system, metadata, blobs, and so on—perhaps including knowledge associated with an exemplary knowledge store, such as the knowledge store module 145 described previously with reference to FIG. 1—may be used to more efficiently obtain the requested blob, perhaps in similar ways to those already described with reference to the blob cache service, or in other ways.

In an exemplary implementation of operation 820, the retrieved or provided blob may be stored by the cloud storage service in a variety of ways. For example, as introduced previously, a cloud storage service might store data, including blobs, using multiple redundant stores. In addition, the cloud storage service may in some cases update or provide information to an exemplary blob lookup service when it has stored the blob, so that the blob lookup service may in some implementations provide locators to other endpoints that reference or identify the cloud storage service, after which the other endpoints may in some cases retrieve blobs from the cloud storage service.

At some point in time, a cloud storage service may receive a request to provide a stored blob, or a portion of a stored blob, in at least some implementations of operation 825. In response to such a request, the cloud storage service may then provide the requested blob data in an exemplary implementation of operation 830, possibly through the use of a variety of communication or transfer mechanisms, including those described elsewhere herein.

Figure 9:
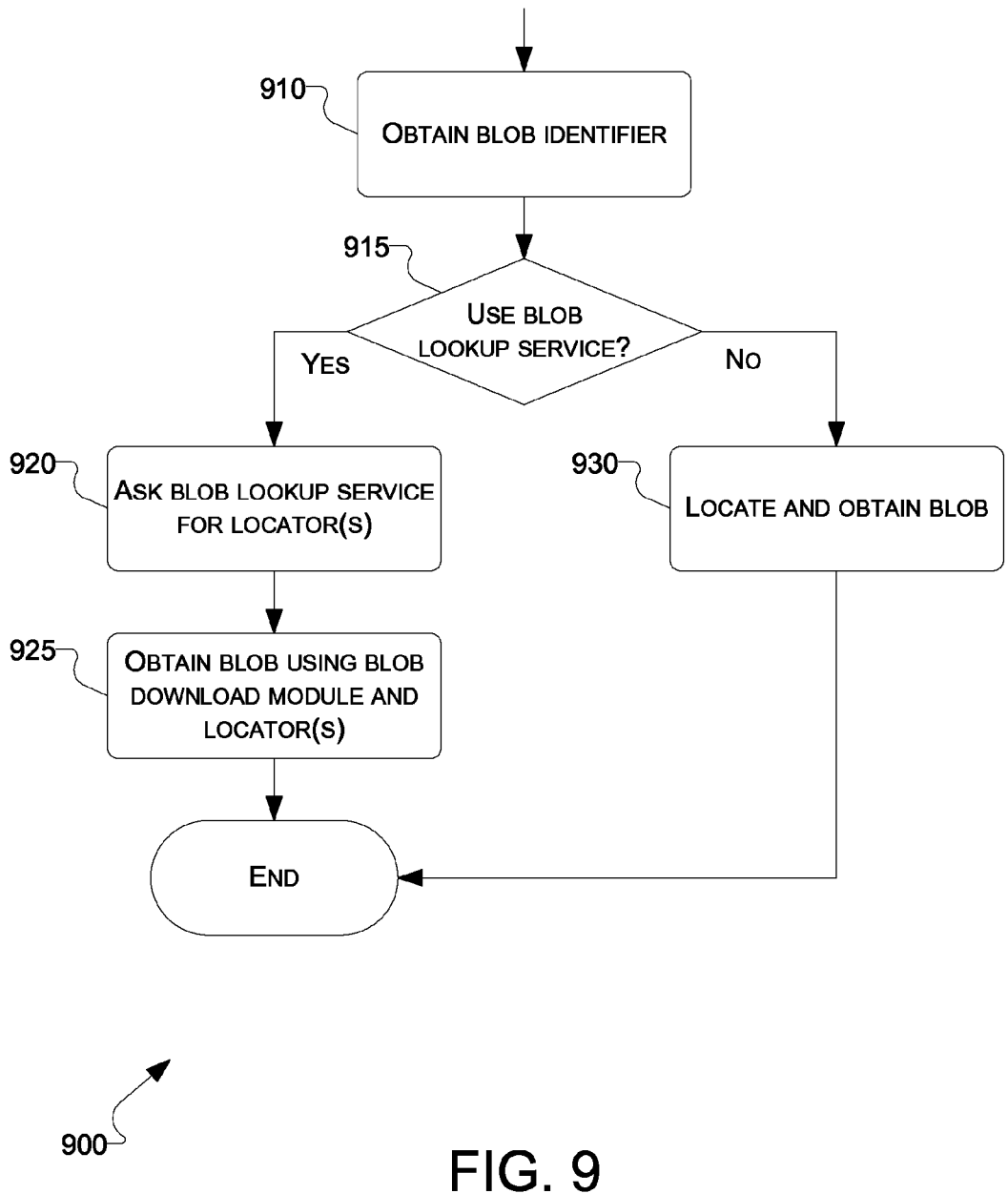
FIG. 9 illustrates an exemplary generalized operational flow including various operations that may be performed when retrieving a blob without the use of full metadata or at least some of the functionality provided by an exemplary server endpoint.

Turning now to FIG. 9, shown therein is an exemplary generalized operational flow 900 including various operations that may be performed when retrieving a blob without the use of full metadata or at least some of the functionality provided by an exemplary server endpoint. The following description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

While much of the description herein describes the retrieval of blob data with the use of metadata, in at least some implementations the use of a full set of metadata may not always be necessary when retrieving blobs. Instead, in some cases only a minimal amount of data—such as just a blob identifier—may be needed to take advantage of various pieces of endpoint functionality including, for example, a blob lookup service and possibly various endpoints that can provide all or part of a blob. In some environments using such functionality may enable an endpoint to more quickly, more cheaply, or in some regard more effectively retrieve a blob.

In an exemplary implementation of operation 910, an endpoint may obtain a blob identifier through some means. In some of the previously described implementations, blob identifiers are included in metadata that may be synchronized between different endpoints. Such synchronized metadata provides at least one mechanism by which an endpoint might obtain a blob identifier. However, in a variety of the same or other implementations, including those implementations that do not synchronize metadata or the like, a blob identifier might be provided in a variety of other ways. For example, a user might send an email or instant message to another user that contains a blob identifier that in turn identifies a blob, such as perhaps an audio or video clip, a word processing document or spreadsheet, some other file, and so on.

In at least some implementations of operation 915, it may be determined whether a blob lookup service should be used to retrieve the blob. For example, some endpoints may not have access to or even know about a blob lookup service. In such a case, and in other cases—including when a blob lookup service is available but is not used—the determination may be made to not use a blob lookup service, and the operational flow 900 may proceed to operation 930. If the blob is to be retrieved using a blob lookup service, the operational flow 900 may proceed to operation 920.

As one example of an environment in which a blob lookup service might or might not be used, consider the example of a web browser. Many web browsers include executable code that enables the download or retrieval of resources using protocols such as HTTP. With such a web browser, an HTTP request may be made to a single server—or at least a single URL—and a response may be received from a single server. However in some cases—for example, when retrieving a blob that may be large—it may be more effective and quicker to download the blob using one or more other mechanisms, including mechanisms, like BitTorrent or BitTorrent-like transfer implementations, where different pieces of a particular blob are retrieved from or supplied by multiple different endpoints.

However, while such mechanisms for downloading files or blobs may be desirable, web browsers may not natively include functionality to enable downloads of this, or other, types. In some cases it may be possible to add functionality to a web browser, or some other application, that adds this capability by, for example, enabling the web browser or application to support the use of a blob lookup service (and also possibly a blob download module, as described in more detail below). For example, a web browser might support "plug-ins" or other code added by users. One such plug-in might implement support for a blob lookup service and, when installed, might enable a web browser to use a blob lookup service (and so to proceed to operation 920, instead of proceeding to operation 930).

In an exemplary implementation of operation 920, the endpoint retrieving the blob may query or ask a blob lookup service for one or more locators associated with the desired blob, perhaps by providing the blob lookup service with some data, like a blob identifier, that identifies the desired blob. Such an operation may be implemented in at least some implementations in a manner that is similar to or the same as the manner in which, for example, the operation 415, described previously with reference to FIG. 4, was implemented.

Then, in an exemplary implementation of operation 925, one or more of the obtained locators and in some cases a blob download module may be used to actually retrieve the blob. Such an operation may be implemented in at least some implementations in a manner that is similar to or the same as the manner in which, for example, the operation 425, described previously with reference to FIG. 4, was implemented.

In some implementations, the endpoint might take additional actions if the blob cannot be downloaded or a retrieval of the blob fails. For example, if the blob lookup service does not supply any locators, or only supplies locators that cannot be used to actually retrieve the blob (because of network conditions, because the endpoints identified by the locators are not available, and so on), the endpoint retrieving the blob might, for example, request that a blob cache service store the blob and then attempt to later retrieve the blob from the blob cache service. Such a mechanism was described previously with reference to, for example, FIG. 4, and is not illustrated in FIG. 9.

If the endpoint successfully retrieves the blob, it may update the blob lookup service with additional information so that the blob lookup service may in some cases identify the endpoint as a source for the blob when other endpoints request the same blob. With such an implementation, it may be possible, for example, for one user in an office, say, to download or retrieve a large file or blob, and have other users, say, in the same office, retrieve the blob from the first user rather than from some other endpoint that might be located elsewhere on one or more other networks. In such an example, after the first user retrieves the blob, an endpoint associated with the first user might have provided a blob lookup service with information that identifies the endpoint. When a second or later user requests the same blob from the blob lookup service, the blob lookup service may provide a locator that identifies the first user's endpoint. In some implementations, the blob lookup service might provide such a locator by using knowledge—including knowledge maintained and provided by a knowledge store—that the first user's endpoint is perhaps geographically closer than the original endpoint, is connected to the second endpoint using a faster network connection than the original endpoint, and so on.

If the blob lookup service is not used, the operational flow 900 may proceed to operation 930. In an exemplary implementation of operation 930, the blob may be retrieved using one or more file transfer or blob retrieval mechanisms that do not directly (but may in some implementations, indirectly) use a blob lookup service or blob download module. Such mechanisms might include HTTP, FTP, file sharing or transfer protocols, and so on. For example, where the blob identifier is something like "http://www.els.live.com/ABC123", the endpoint may simply initiate an HTTP request to the URL embodied by the blob identifier. In some implementations, the server endpoint or HTTP server that responds to the request for the blob might then be configured to use URLs of this particular form by extracting an identifier (such as "ABC123") and using the identifier to locate the requested blob, and then finally to return the blob in an HTTP response. (In some cases a server endpoint itself might locate the blob by using operations that are the same as or similar to, for example, the blob retrieval operations previously described with reference to FIG. 4. In the same or other implementations, a server endpoint might only return blobs that exist in a specific storage location, such as a blob cache service or a cloud storage service.)

Example Computing Environment

Figure 10:
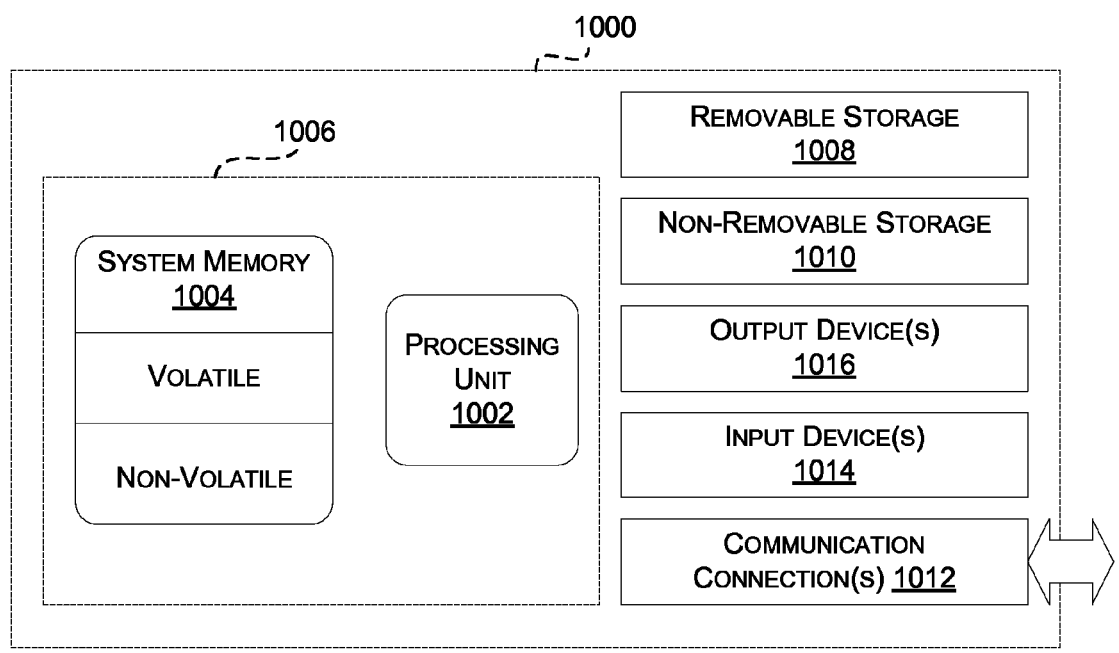
FIG. 10 illustrates an exemplary computing environment in which the various technologies described herein may be implemented.

Turning now to FIG. 10, this figure and the related description are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1000 illustrated in FIG. 10.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1000 illustrated in FIG. 10, in its most basic configuration, includes at least one processing unit 1002 and memory 1004. In some implementations, the computing device 1000 may implement at least part of, for example, one of the endpoints described previously with reference to FIG. 1, such as the server endpoint 110, the device endpoint A 160, the device endpoint B 170, and so on. In some implementations, the processing unit 1002 may be a general purpose central processing unit (CPU), as exists, for example, on a variety of computers, including desktop and laptop computers. Depending on the exact configuration and type of computing device, the memory 1004 may be volatile (such as RAM), non-volatile (such as ROM, flash memory, etc.), or some combination of the two. This most basic configuration is illustrated in FIG. 10 by dashed line 1006. Additionally, the computing device 1000 may also have additional features and functionality. For example, the computing device 1000 may also include additional storage (removable and/or non-removable) including, but not limited to, magnetic or optical disks or tape. Such additional storage is illustrated in FIG. 10 by the removable storage 1008 and the non-removable storage 1010.

The computing device 1000 may also contain one or more communications connection(s) 1012 that allow the computing device 1000 to communicate with other devices and services. For example, the computing device might have one or more connections to a variety of communication means or computing devices, including, for example, connections to or between endpoints as described previously with reference to FIG. 1. The computing device 1000 may also have one or more input device(s) 1014 such as an image input devices like cameras or scanners, keyboards, mice, pens, voice input devices including microphone arrays, touch input devices, and so on. One or more output device(s) 1016 such as a display, speakers, printer, and so on, may also be included in the computing device 1000.

Those skilled in the art will appreciate that the technologies described herein may be practiced with computing devices other than the computing device 1000 illustrated in FIG. 10. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 10, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. One or more computer-readable memory devices or storage devices having instructions stored thereon that, when executed by a computing device, cause the computing device to perform acts, the acts comprising:
   performing a local change to data on a first endpoint, the local change comprising creating the data by the first endpoint or modifying the data by the first endpoint;
   modifying metadata maintained by the first endpoint to reflect the local change to the data performed by the first endpoint;
   communicating the modified metadata from the first endpoint to a server endpoint via a feed using a synchronization protocol, wherein the server endpoint is configured to communicate the modified metadata to a second endpoint via another feed using the synchronization protocol;

receiving, by the first endpoint, a request from the second endpoint for the data; and sending the data from the first endpoint to the second endpoint responsive to the request.

2. The one or more computer-readable memory devices or storage devices of claim 1, wherein the data comprises part or all of a binary large object.

3. The one or more computer-readable memory devices or storage devices of claim 2, wherein the data is all of the binary large object and the acts further comprise:

sending, by the first endpoint, all of the binary large object to the second endpoint responsive to the request.

4. The one or more computer-readable memory devices or storage devices of claim 2, wherein the data is a portion of the binary large object and the acts further comprise:

sending, by the first endpoint, the portion of the binary large object to the second endpoint responsive to the request.

5. The one or more computer-readable memory devices or storage devices of claim 1, the acts further comprising:

obtaining, by the first endpoint, additional metadata from the server endpoint identifying other data that is available from a third endpoint; and obtaining the other data from the third endpoint.

6. The one or more computer-readable memory devices or storage devices of claim 5, the acts further comprising:

synchronizing the feed with the server endpoint by merging the additional metadata obtained from the server endpoint with the metadata maintained by the first endpoint, the merging comprising creating a new local item corresponding to the other data.

7. The one or more computer-readable memory devices or storage devices of claim 1, the acts further comprising:

obtaining, by the first endpoint, additional metadata from the server endpoint indicating another change to the data by a third endpoint; and updating the data on the first endpoint to incorporate the another change to the data.

8. The one or more computer-readable memory devices or storage devices of claim 7, the acts further comprising:

synchronizing the feed with the server endpoint by merging the additional metadata obtained from the server endpoint with the metadata maintained by the first endpoint to identify a winning item and a losing item, wherein the data is updated on the first endpoint in instances when the metadata maintained by the first endpoint includes the losing item.

9. A system comprising the one or more computer-readable memory devices or storage devices of claim 1 and the computing device, wherein the computing device is the first endpoint.

10. A method comprising:

synchronizing a feed maintained by a server endpoint with a first endpoint, the synchronizing comprising, by the server endpoint:

obtaining metadata from the first endpoint, wherein the metadata obtained from the first endpoint includes an identifier of data that has been modified by the first endpoint and the data is not communicated by the first endpoint to the server endpoint with the metadata; and updating the feed maintained by the server endpoint by merging the metadata obtained from the first endpoint with other metadata maintained by the server endpoint;

identifying a second endpoint that has subscribed or registered to be notified when the other metadata changes; and notifying the second endpoint that has subscribed or registered that the other metadata has changed, wherein at least the synchronizing is performed using a synchronization protocol for communicating the feed maintained by the server endpoint.

11. The method according to claim 10, wherein the data is part of a data object.

12. The method according to claim 11, further comprising:

identifying, to the second endpoint, another endpoint from where other data of the data object can be retrieved.

13. The method according to claim 10, further comprising:

in an instance when the data is available from the second endpoint, updating a blob lookup service to indicate that other endpoints can retrieve the data from the second endpoint.

14. One or more computer-readable memory devices or storage devices having instructions stored thereon that, when executed by a computing device, cause the computing device to perform acts, the acts comprising:

synchronizing a feed maintained by a server endpoint with a first endpoint, the synchronizing comprising, by the server endpoint:

obtaining metadata from the first endpoint, wherein the metadata obtained from the first endpoint includes an identifier of data that has been created or modified by the first endpoint and the data is not communicated by the first endpoint to the server endpoint with the metadata; and updating the feed maintained by the server endpoint by merging the metadata obtained from the first endpoint with other metadata maintained by the server endpoint;

identifying a second endpoint that has subscribed or registered to be notified when the other metadata changes; and notifying the second endpoint that has subscribed or registered that the other metadata has changed, wherein at least the synchronizing is performed using a synchronization protocol for communicating the feed maintained by the server endpoint.

15. The one or more computer-readable memory devices or storage devices of claim 14, wherein the notifying is performed responsive to updating the feed without receiving a request from the second endpoint.

16. The one or more computer-readable memory devices or storage devices of claim 14, the acts further comprising:

communicating the other metadata to the second endpoint.

17. The one or more computer-readable memory devices or storage devices of claim 14, the acts further comprising:

responsive to a request received from the second endpoint, providing the second endpoint with multiple locators identifying multiple locations where different portions of the data can be obtained, wherein an individual locator provided to the second endpoint identifies the first endpoint.

18. The one or more computer-readable memory devices or storage devices according to claim 17, the acts further comprising:

identifying multiple other endpoints that have subscribed to the feed;

notifying the multiple other endpoints that have subscribed to the feed that the other metadata has changed; and responsive to requests received from the at least some of the multiple other endpoints, providing the multiple other endpoints with the multiple locators identifying the multiple locations where the different portions of the data can be obtained, including the individual locator that identifies the first endpoint.

19. The one or more computer-readable memory devices or storage devices of claim 14, wherein the feed is in a markup language format and the data is in a binary format.

20. A system comprising the one or more computer-readable memory devices or storage devices of claim 14 and the computing device, wherein the computing device is the server endpoint.

* * * * *